US011064253B2

United States Patent
Cormie et al.

(10) Patent No.: US 11,064,253 B2
(45) Date of Patent: Jul. 13, 2021

(54) CONTENT MANAGEMENT OF A CONTENT FEED

(71) Applicant: Roku, Inc., San Jose, CA (US)

(72) Inventors: Steven M. Cormie, Cambridge (GB); Stefan Liassides, Cardiff (GB)

(73) Assignee: Roku, Inc., San Jose, CA (US)

( * ) Notice: Subject to any disclaimer, the term of this patent is extended or adjusted under 35 U.S.C. 154(b) by 164 days.

(21) Appl. No.: 16/295,626

(22) Filed: Mar. 7, 2019

(65) Prior Publication Data

US 2019/0272563 A1    Sep. 5, 2019

Related U.S. Application Data

(63) Continuation of application No. 15/459,627, filed on Mar. 15, 2017, now Pat. No. 10,395,277, which is a
(Continued)

(51) Int. Cl.
*H04N 21/442* (2011.01)
*H04N 21/234* (2011.01)
(Continued)

(52) U.S. Cl.
CPC ... *H04N 21/44222* (2013.01); *G06K 9/00751* (2013.01); *G06Q 30/0249* (2013.01); *G06Q 30/0261* (2013.01); *H04L 67/02* (2013.01); *H04L 67/18* (2013.01); *H04N 21/20* (2013.01); *H04N 21/21* (2013.01); *H04N 21/234* (2013.01); *H04N 21/23418* (2013.01); *H04N 21/23424* (2013.01); *H04N 21/25883* (2013.01); *H04N 21/2668* (2013.01); *H04N 21/4312* (2013.01);
(Continued)

(58) Field of Classification Search
None
See application file for complete search history.

(56) References Cited

U.S. PATENT DOCUMENTS 6,510,557 B1    1/2003   Thrift
9,380,325 B1    6/2016   Cormie et al.
(Continued)

OTHER PUBLICATIONS

International Search Report and Written Opinion for International Patent Application No. PCT/US2016/029227, dated Jul. 26, 2016, 10 pages.

*Primary Examiner* — Justin E Shepard
(74) *Attorney, Agent, or Firm* — McDonnell Boehnen Hulbert & Berghoff LLP

(57) ABSTRACT

A processing device and method are disclosed to manage content of a content feed is disclosed. The method can include receiving, from a client device, an overlay request for an overlay content. The method can also include select a first overlay content from a plurality of overlay contents. The method can further include determining when an amount remaining in a monetary budget, associated with the overlay request, exceeds a threshold monetary budget. The method can further include determining when a number of times the overlay content has been displayed does not exceed a threshold number of times. The method can further include retrieving, from an overlay database, the first overlay content. The method can further include delivering, to the client device, the first overlay content.

20 Claims, 12 Drawing Sheets

Related U.S. Application Data continuation of application No. 14/820,476, filed on Aug. 6, 2015, now Pat. No. 9,641,870.

(60) Provisional application No. 62/049,995, filed on Sep. 12, 2014.

(51) Int. Cl.

| | | |
|---|---|---|
| *H04N 21/44* | (2011.01) | |
| *H04N 21/2668* | (2011.01) | |
| *H04N 21/81* | (2011.01) | |
| *H04N 21/84* | (2011.01) | |
| *G06K 9/00* | (2006.01) | |
| *G06Q 30/02* | (2012.01) | |
| *H04L 29/08* | (2006.01) | |
| *H04N 21/20* | (2011.01) | |
| *H04N 21/21* | (2011.01) | |
| *H04N 21/4402* | (2011.01) | |
| *H04N 21/85* | (2011.01) | |
| *H04N 21/858* | (2011.01) | |
| *H04N 21/258* | (2011.01) | |
| *H04N 21/431* | (2011.01) | |
| *H04N 21/45* | (2011.01) | |
| *H04N 21/61* | (2011.01) | |
| *H04L 29/06* | (2006.01) | |

(52) U.S. Cl.
 CPC ....... *H04N 21/44* (2013.01); *H04N 21/44008* (2013.01); *H04N 21/44016* (2013.01); *H04N 21/440245* (2013.01); *H04N 21/4532* (2013.01); *H04N 21/6125* (2013.01); *H04N 21/812* (2013.01); *H04N 21/84* (2013.01); *H04N 21/85* (2013.01); *H04N 21/858* (2013.01); *H04N 21/8583* (2013.01); *G06Q 30/0277* (2013.01); *H04L 67/42* (2013.01)

(56) References Cited

U.S. PATENT DOCUMENTS

| | | |
|---|---|---|
| 2006/0117343 A1 | 6/2006 | Novak et al. |
| 2006/0130095 A1 | 6/2006 | Willis et al. |
| 2006/0248569 A1* | 11/2006 | Lienhart .............. H04N 21/812 725/135 |
| 2007/0263011 A1 | 11/2007 | Hallberg |
| 2009/0094073 A1* | 4/2009 | Cheung ............. G06Q 30/0248 705/14.47 |
| 2011/0026761 A1 | 2/2011 | Radhakrishnan et al. |
| 2011/0247042 A1 | 10/2011 | Mallinson |
| 2011/0321084 A1 | 12/2011 | Takahashi et al. |
| 2011/0321087 A1 | 12/2011 | Huber |
| 2012/0303426 A1* | 11/2012 | Morad .................. G06Q 30/02 705/14.4 |
| 2013/0205315 A1 | 8/2013 | Sinha et al. |
| 2014/0026993 A1 | 1/2014 | Rosen et al. |
| 2014/0035965 A1 | 2/2014 | Toyomura et al. |
| 2014/0067828 A1 | 3/2014 | Archibong |
| 2014/0282650 A1 | 9/2014 | Viles et al. |
| 2014/0282670 A1 | 9/2014 | Sinha et al. |
| 2014/0282723 A1 | 9/2014 | Sinha et al. |
| 2014/0289650 A1 | 9/2014 | Cotlarciuc et al. |
| 2014/0344871 A1 | 11/2014 | Martin et al. |
| 2014/0359656 A1 | 12/2014 | Banica et al. |
| 2015/0163563 A1 | 6/2015 | An et al. |
| 2015/0181311 A1 | 6/2015 | Navin et al. |
| 2017/0132659 A1* | 5/2017 | Dirks ................. G06Q 30/0247 |

\* cited by examiner

CONTENT MANAGEMENT OF A CONTENT FEED

CROSS-REFERENCE TO RELATED APPLICATION

This application is a continuation of U.S. application Ser. No. 15/459,627, filed Mar. 15, 2017, which is a continuation of U.S. application Ser. No. 14/820,476, filed Aug. 6, 2015, which claims the benefit of U.S. Provisional Application No. 62/049,995, filed Sep. 12, 2014, the entire disclosures of which are incorporated herein by reference.

BACKGROUND

Content feeds can be generated at a central location and distributed to a variety of locations. For example, a television channel can be distributed from a content provider to a number of local broadcasters. The content feeds can include advertisements inserted by advertisers or broadcasters to promote a product or provide additional information on a matter to a group of viewers. Traditionally, advertisers and providers relied on fixed content feeds (e.g., content that was fixed at the time of broadcasting) to promote products or provide information to all viewers. To target viewers, advertisers or broadcasters could select when the fixed content was advertised based on an audience analysis and ratings provider, such as The Nielsen Company.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

Figure 1:
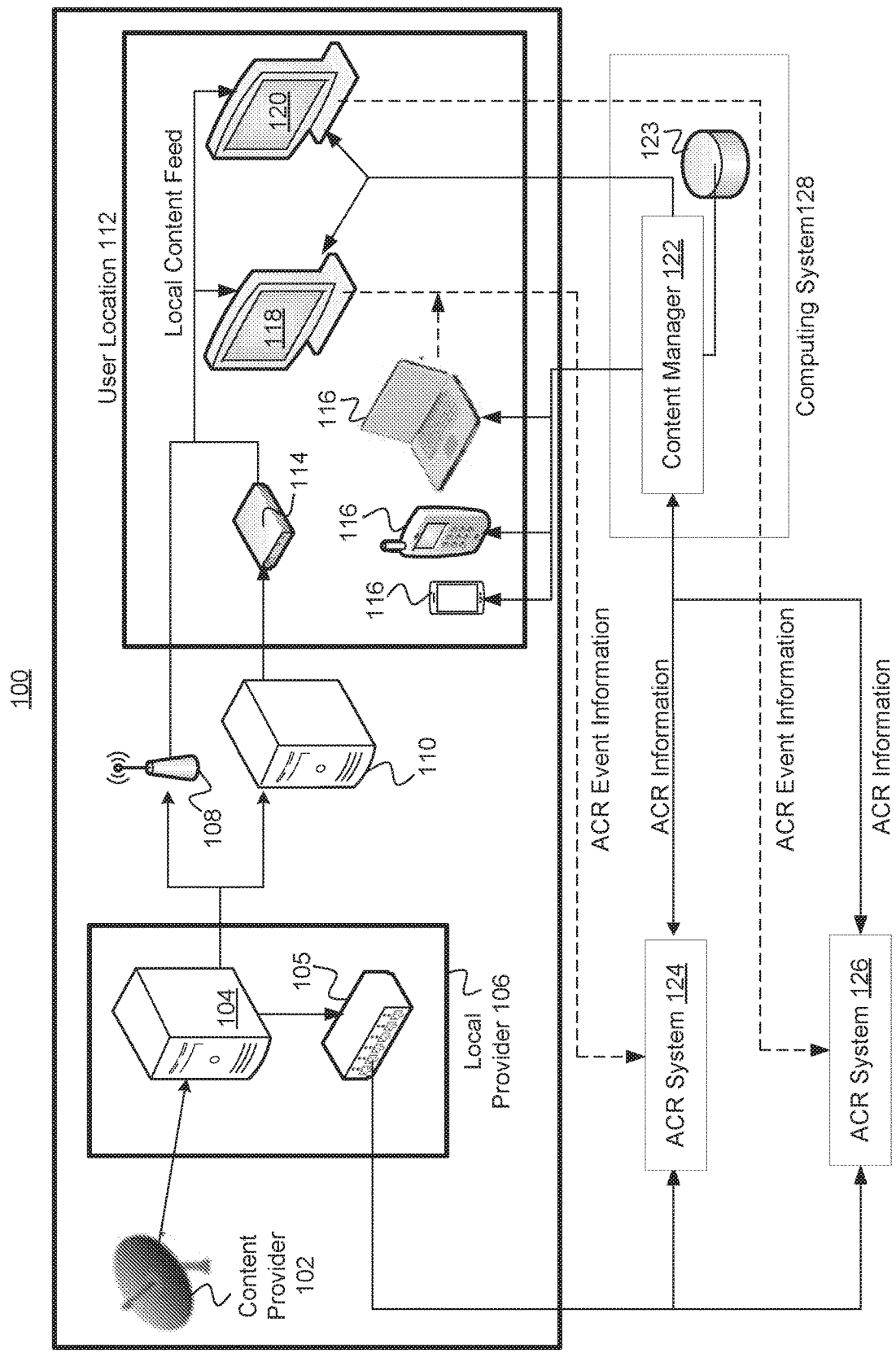
FIG. 1 illustrates a system diagram of a content distribution network according to one embodiment.

Media content broadcasting or streaming, such as television (TV) show broadcasting, can be an engaging venue to advertise products and services, provide information to viewers, or any combination thereof. However, traditional content broadcasting or streaming can lack targeted and personalized content, such as targeted advertisements. Additionally, traditional content broadcasting or streaming lacks a return path for users to engage with the broadcasted content or streamed content. Also, traditional content broadcasts do not enable retargeting of the viewers once the broadcast content has been viewed.

The embodiments described herein are methods, systems, and devices for overlaying or superimposing overlay content on media content, such as broadcast content. In one example, a client device, such as a content aware smart television (TV) or a video consuming device, can request a content overlay when the device detects a match between the overlay content and the media content. A content overlay can be an overlaying or superimposing of media content onto a content feed. In this example, the client device can use selected parameters to identify targeted overlay content that can be placed, overlayed, or superimposed over the matching media content. In another example, general non-targeted overlay content can be placed over the media content.

The word "content" can be used to refer to media or multimedia. The word "content" can also be a specific term that means the subject matter of the medium rather than the medium itself. Likewise, the word "media" and some compound words that include "media" (e.g. multimedia, hypermedia) are instead referring to content, rather than to the channel through which the information is delivered to the end user/audience. Media or media content can include graphical representations, such as: videos, such as films, TV shows, commercials, streaming video, and so forth; text; graphics; animations; still images; interactivity content forms; and so forth. An example of a type of content commonly referred to as a type of media is a "motion picture" referred to as "a film."

Overlay content can be media content that includes: advertisements, news alerts, announcements, or other information in addition to media content of a content feed that can be currently displayed to viewers. Media content can be matched with overlay content using an overlay scheme, such as decomposing the media content into a series of frames or sections. The overlay scheme can analyze the frames or sections of the media content to determine a topic or subject of the media content. For example, the overlay scheme can determine that the frames or sections of the media content include information regarding hunting, traveling, politics, and so forth. The overlay scheme can then match overlay content that contains material relevant to the media content. In this example, for each of the series of frames or sections, overlay content can be identified from a set of overlay content relevant to the series of frames or sections. In another example, the frames or sections of the media content can include tags or identifiers used to match the frames or sections with the overlay content. For example, the tags or identifiers can include information describing content of the frames or sections for matching with the overlay content.

In another example, the overlay scheme can be used to identify spatial positions within the frames or sections at which to insert the overlay content. In another example, the overlay scheme can be used to identify temporal positions within the frames or sections to insert the overlay content. When an overlay area is identified, overlay content can be inserted or superimposed over media content frame at the overlay area. In one example, an overlay area can be selected from a plurality of predetermined or predefined overlay areas in one or more frames of the media content. In another example, the overlay area can be a random location in the media content frames.

A server device or a content manager can combine media content with specific overlay content, timely overlay content, targeted overlay content, or a combination thereof. In one example, the content overlay system or content overlay device can enable overlay content providers to engage with viewers by inviting the viewers to respond to a call to action within the content overlays (e.g., an invitation to engage the content overlay). One advantage of inviting the viewers to a call to action can be to provide a return path or follow-up path for the viewers to request additional information, ask questions, provide input, contact a provider of a service or product advertised, and so forth. Another advantage of inviting the viewer to a call to action can be to provide a return path or follow up path for the advertisers to provide additional information, further engage the viewers, gather additional information about the viewers, answer viewer questions about the product or service advertised, and so forth. In another example, the content overlay system or the content overlay device can enable an advertiser to use cross-platform retargeting campaigns once a viewer has viewed or interacted with overlay content.

The embodiment described herein can be used to increase an impact and effectiveness of broadcast content displayed to viewers. For example, overlay content can be used to provide targeted media content to particular sets of viewers, such as targeted advertisements for viewers of a selected demographic or location. Additionally, the overlay content can be used to interact with targeted viewers when the viewers see the targeted media content. For example, consumers or viewers of the broadcast content generally tend to select broadcast content that includes media items that can be interesting to them (such as TV shows or movies of interest). Targeted advertisements can be linked to broadcast content that is relevant to a media item, such as linking a product advertisement to a news item during a news broadcast. Linking overlay content with broadcast content, as described herein, can be used direct advertisements or other information to consumers who are interested in a related media item in the broadcast content.

FIG. 1 illustrates a system diagram of a content distribution and viewing data aggregation network 100 according to one example. In the content distribution and viewing data aggregation network 100, a content provider 102 can broadcast a content feed to a local provider 106. The local provider 106 can include a headend 104 and an automatic content recognition (ACR) fingerprinter server 105. The content feed from the content provider 102 can be received at the headend 104 of the local provider 106. The headend 104 can generate a local content feed based on the received content feed. For example, the headend 104 can be a local affiliate broadcaster receiving a network channel with programming and advertisements from a national or global broadcaster.

The headend 104 can communicate the local content feed to the ACR fingerprinter server 105, an over-the-air (OTA) broadcaster 108, a multichannel video programming distributor (MVPD) 110, or a combination thereof. The OTA broadcaster 108 or the MVPD 110 can communicate the local content feed to a media device. Some examples of media devices can include client devices 118 and 120, a set top box 114 that streams provider content to the client devices 118 and 120, as well as other devices 116 through which the user can stream the local content feed, e.g., wirelessly.

In one example, the OTA broadcaster 108 can broadcast the local content feed using traditional local television or radio channels. In this example, the client devices 118 and 120 can include antennas (such as TV or radio antennas) and receive the local content feed. In another example, the MVPD 110 (such as cable or satellite broadcaster) can communicate the local content feed to a set top box device 114. In this example, the set top box device 114 can format the content feed for the client devices 118 and 120 and can communicate the formatted content feed to the client devices 118 and 120. The client devices 118 and 120 can include a display device, such as a television screen or a touch screen, to display the local content to a viewer. Various components of the content distribution and viewing data aggregation network 100 can be integrated or coupled to the client devices 118 and 120. For example, a smart television can include the antennas, the set-top box device 114, and a display device in a single unit.

The ACR fingerprint server 105 can analyze the local content feed and determine fingerprint information (e.g., fingerprints). The ACR fingerprint server 105 can communicate the fingerprints to ACR system 124, ACR system 126, or a combination thereof. The ACR systems 124 and 126 can be different ACR systems selected by device manufacturers that may employ different ACR technologies, such as smart TV manufacturers.

The ACR fingerprint server 105 can analyze the local content feed and capture fingerprints, which can include an ordered sequence of frames from the local content feed. The ACR fingerprint server 105 can communicate the fingerprints to the ACR systems 124, ACR system 126, or a combination thereof. The ACR systems 124 and 126 can be different ACR systems selected by device manufacturers, such as smart TV manufacturers. In one example, the ACR fingerprint server 105 can format fingerprints for the different ACR systems 124 and 126. The ACR systems 124 and 126 can establish communication connections with the different client devices 118 and 120, respectively. The client devices 118 and 120 can communicate fingerprint information to the ACR systems 124 and 126, respectively. When the ACR system 124 or 126 receives fingerprint information from the client device 118, the client device 120, or both, the ACR system 124 or 126 can match the received fingerprints with those generated by the ACR fingerprint server 105. When a match occurs and the content has been identified, the ACR system 124 or 126 can communicate ACR events to a computing system 128. The ACR events can include: the client device 118 or 120 turning on, the client device 118 or 120 turning off, media content starting to be displayed on the client device 118 or 120, ending displaying the media content on the client device 118 or 120, the client device showing a startup screen (such as an Xbox® startup screen, Netflix® startup screen, or a Comcast® startup screen), a commercial starting to be displayed on the client device 118 or 120, ending displaying the commercial on the client device 118 or 120, changing a channel on the client device 118 or 120, or the client device 118 or 120 experiencing an unexpected occlusion. The computing system can include a content manager 122 and a database 123.

In another example, the ACR system 124 or 126 can receive fingerprint information from the client device 118 or 120 and can match the received fingerprints with those generated by the ACR fingerprint server 105. When a match occurs and the content has been identified, the ACR system 124 or 126 can notify the client device 118 or 120 of the ACR events and then the client device 118 or 120 can communicate those ACR events to a content manager 122. Alternatively, or additionally, the ACR system 124 or 126 can directly communicate the ACR events to the content manager 122. The fingerprint information can include: a display of advertisements in the local content feed to a viewer, a display of selected or flagged content in the local content feed to a viewer, a change of content channel at the client device 118 or 120, and so forth.

The event information from the different ACR systems 124 and 126 can be in different formats or orders and the content manager 122 can normalize the data into a common format before storing the data into a database stored at or across a network from the ACR system 124 or 126. For example, the content manager 122 can receive disparate data sets from the ACR systems 124 and 126 that include similar but not identical data, such as data with the same content but formatted differently. The content manager 122 can process and reformat the disparate data sets to create a single data model or format (e.g., reformatted data sets) and the reformatted data sets can be populated into a database 123 in the content manager 122.

In one embodiment, to normalize disparate data sets from ACR systems 124 and 126, the content manager 122 can cleanse or filter data in the data sets. For example, some data sets can contain fields or data that can be irrelevant to the content manager 122. In this example, the content manager 122 can cleanse or filter the irrelevant data (e.g., the data can be removed or ignored). In another example, some data sets can include instances of incomplete or incorrect data or data sets and the content manager 122 can cleanse or filter the incomplete or incorrect data or data sets. In another embodiment, to normalize the disparate data sets from ACR systems 124 and 126, the content manager 122 can map fields of the data sets. For example, when the content manager 122 receives a first data set from the ACR system 124 and a second data set from the ACR system 126, at least some of the data fields of the first data set and the second data set can be common to both the first and second data set. However, the common data fields can be located at different places in the first and second data sets. In this example, the content manager 122 can map the different data fields of the first and second data sets to normalized fields and have the same data fields in the same data field locations in the database 123. The content manager 122 can reorder common data field locations of the first viewing data and the second viewing data same data fields to the single data model (e.g., a single data format).

In another embodiment, to normalize disparate data sets from the ACR systems 124 and 126, the content manager 122 can derive data from the data sets. For example, data from the ACR system 124 or 126 may not contain all of the fields that are needed to fill the data fields in the database. However, the content manager 122 can use other fields in the data sets from the ACR systems 124 and 126 to derive data for these data fields.

In one example, the database 123 can include data fields for such as a state in a country field, a designated market area (DMA), and a county field or city field but the data sets from the ACR systems 124 and 126 may only include zone improvement plan (ZIP) codes. In this example, the content manager 122 can use the ZIP codes to derive data for the fields in the database. In another example, the data set may not contain any geographic location information, but can include an internet protocol (IP) address of the client device 118 or 120. In this example, the content manager 122 can use a geo-IP lookup service to derive the state, DMA, county, city and ZIP code information.

In another example, the database 123 can include demographic fields such as an age field, a gender field, a household income field, and so forth. However, the data sets from the ACR systems 124 and 126 may not include the demographic fields or demographic data. In this example, the ACR systems 124 and 126 can provide the content manager 122 with the IP address of the client devices 118 and 120. The content manager 122 can use the IP addresses to determine the demographic data to populate the data fields in the database. In another example, the ACR systems 124 or 126 can provide the IP addresses to a third party that can match the IP addresses to demographic data. The third party can then provide the matched demographic data to the content manager 122, thereby avoiding the content manager 122 knowing the IP addresses.

In another example, a field in a first data set from the ACR system 124 can include local time zone information, such as a mountain daylight time (MDT) zone, and a second data set from the ACR system 126 can include information from another time zone, such as a coordinated universal time (UTC) zone. The database can store all data using the UTC and the content manager 122 can convert the local time to UTC before storing the data in the database 123.

In one embodiment, the content manager 122 can use the normalized data to generate reports or data (viewing data) about user viewing behavior across different ACR technology vendors and smart TV or other Internet-connected video devices. The content manager 122 and the client devices 118 and 120 can include communications interfaces to communicate information, such as overlay content, between the client devices 118 and 120 and the content manager 122. In one example, the communication interface can communicate the information using a cellular network, a wireless network, or a combination thereof. In one example, the communications network can be a cellular network employing a third generation partnership project (3GPP) release 8, 9, 10, 11, or 12 or Institute of Electronics and Electrical Engineers (IEEE) 802.16p, 802.16n, 802.16m-2011, 802.16h-2010, 802.16j-2009, 802.16-2009. In another embodiment, the communications network can be a wireless network (such as a network using the Wi-Fi® technology developed by the Wi-Fi Alliance) that can follow an IEEE® standard developed by the Institute of Electrical and Electronics Engineers, Inc., such as the IEEE 802.11-2012, IEEE 802.11ac, or IEEE 802.11ad standards. In another embodiment, the communications network can be a Bluetooth® connection developed by Bluetooth Special Interest Group (SIG) such as Bluetooth v1.0, Bluetooth v2.0, Bluetooth v3.0, or Bluetooth v4.0. In another embodiment, the communications network can be a Zigbee® connection developed by the ZigBee Alliance such as IEEE 802.15.4-2003 (Zigbee 2003), IEEE 802.15.4-2006 (Zigbee 2006), IEEE 802.15.4-2007 (Zigbee Pro).

In one example, the content manager 122 can also instruct the client device 118 or 120 to replace portions of the local content feed received from the OTA broadcaster 108 or the MVPD 110 with overlay content. In another example, the content manager 122 can instruct the client device 118 or 120 to overlay or superimpose overlay content onto portions of the local content feed. The content manager 122 can aggregate ACR information across multiple ACR systems 124 and 126 and can communicate overlay content to different client devices 118 and 120. The client devices 118 and 120 can be from different device manufacturers.

The content manager 122 can also establish communication connections with other devices 116. In one example, the other device 116 can communicate with the client device 118 or 120 and provide an additional screen (e.g., a second screen) to display overlay content. For example, the client devices 118 and 120 can receive the local content feed from the OTA broadcaster 108 or the MVPD 110 and display the local content feed to the user. The other devices 116 can also communicate ACR event information to the ACR systems 124 and 126 when an ACR event occurs, as discussed in the preceding paragraphs. When the content manager 122 receives the ACR event information, the content manager 122 can communicate overlay content to the other devices 116.

In one example, the client devices 118 and 120 can continue to display the local content feed while the other devices 116 display the overlay content. In another example, the client devices 118 and 120 and the other devices 116 can both display the overlay content. In another example, the client devices 118 and 120 and the other devices 116 can display a portion of the overlay content and a portion of the local content feed. In another example, the client devices 118 and 120 and the other devices 116 can display different local content feeds, overlay content, or a combination thereof.

In one example, the client devices 118 and 120, the other devices 116, or a combination thereof, can display the overlay content at the time the overlay content is received. In another example, the client devices 118 and 120 and the other devices 116 can both display the overlay content. In another example, the client devices 118 and 120 and the other devices 116 can display a portion of the overlay content and a portion of the local content feed. The threshold period of time can be a predefined period of time or the content manager 122 can select a period of time for the client devices 118 and 120, the other devices 116, or a combination thereof, to delay displaying the overlay content.

Figure 2:
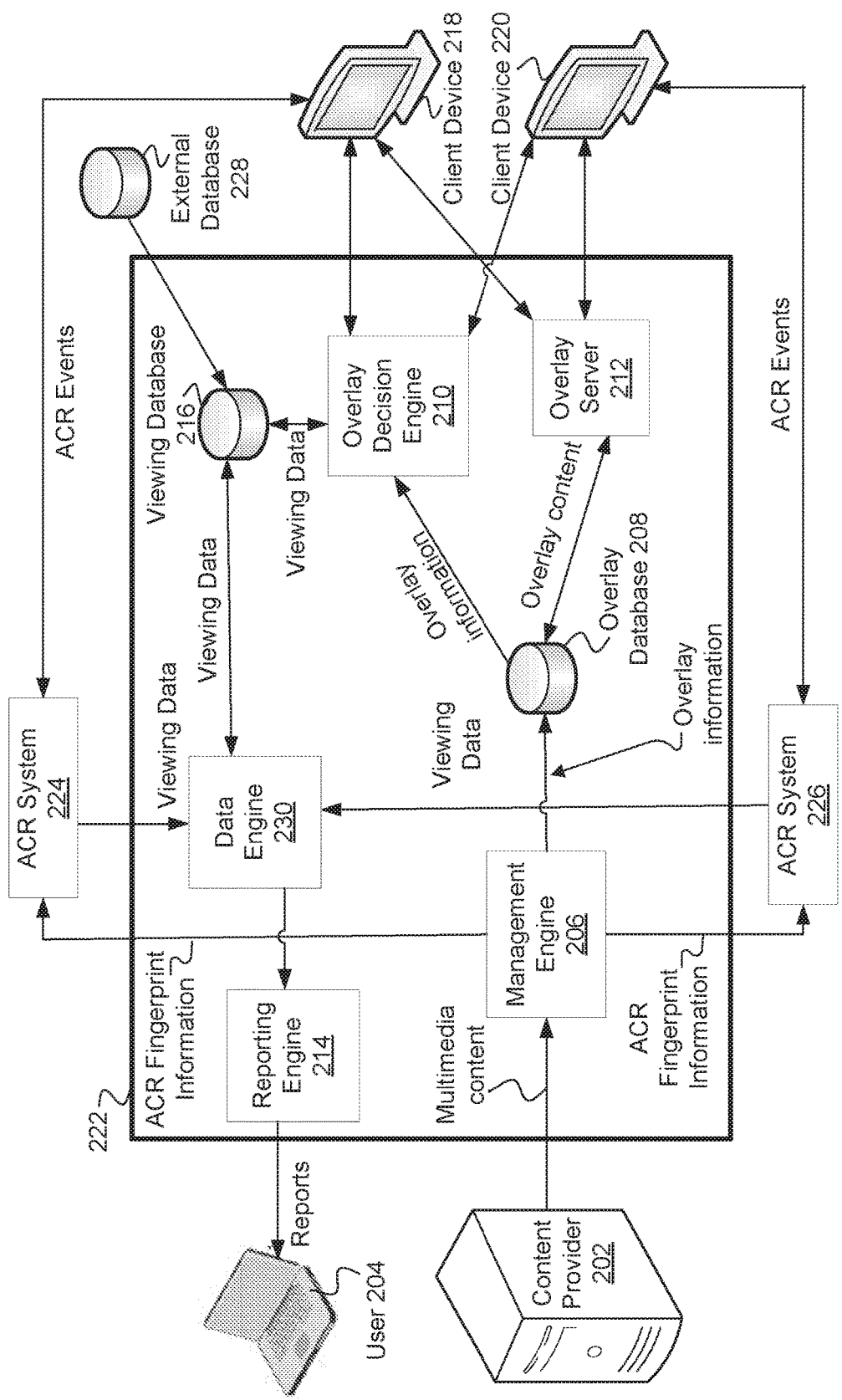
FIG. 2 illustrates a content manager to provide overlay content to a client device according to one embodiment.

FIG. 2 illustrates a content manager 222 to provide overlay content to, and collect viewing data from, client device 218 or 220 according to one embodiment. The content manager 222 can include a management engine 206, an overlay database 208, an overlay decision engine 210, an overlay server 212, a reporting engine 214, a viewing database 216, and a data engine 230. A content provider 202 can upload media content to the management engine 206. A content provider 202 can also inform the management engine of media to be overlaid using a third party show identification (ID) such as Gracenotes® Tribune Media Services (TMS) ID. In one embodiment, the management engine 206 can communicate the media content to an ACR system 224 or 226 and the ACR system 224 or 226 can produce its own fingerprint information. In another embodiment the management engine 206 can process the media content to produce fingerprints in the appropriate formats for the ACR systems 224 and 226 and communicate the fingerprints to the appropriate ACR system 224 or 226. Each ACR system 224 and 226 can use different formats for fingerprints.

In another example, fingerprints can be generated by fingerprinting every frame of a feed, every other frame of the feed, and so forth. For example, the ACR system 224 can generate a fingerprint for a frame of the feed by performing a discrete cosine transform (DCT) of the frame and designating a subset of the resulting coefficients (e.g., the low-frequency coefficients) as the fingerprint. The client devices 218 and 220 can communicate fingerprint information to their respective ACR System 224 and 226. Each fingerprint of a segment of the feed can be associated with a time index. The time index can be a time stamp when the segment of the feed was received by the ACR system 224 or 226. Alternatively, the time index can be a number of frames in the feed from an arbitrary starting point.

The management engine 206 can also receive overlay information from the content provider 202, where the overlay information can include overlay content and targeting information. The management engine 206 can store the overlay information, including the overlay content or a reference to the overlay content, in the overlay database 208. The overlay database 208 may be a single database or multiple databases. For example, the targeting information may be stored in one database and the overlay content may be stored in another database. The ACR systems 224 and 226 can communicate to the client devices 218 and 220, respectively, ACR event information and broadcast content, where the ACR event information can indicate when to trigger overlaying of content.

The client devices 218 and 220 can monitor the broadcast content and can send event information or fingerprint information to the ACR systems 224 and 226. The event information or fingerprint information can indicate when an ACR event occurs. On the detection of an ACR event, the client devices 218 and 220 can send a request for an overlay to the overlay decision engine 210. The overlay decision engine 210 can use targeting information retrieved from the overlay database 208 to determine the most suitable overlay and deliver appropriate overlay information, including information about the overlay server 212 to request the overlay from the client devices 218 and 220. The client devices 218 and 220 can use the overlay information to request the appropriate overlay content from the overlay server 212. Upon request by the client devices 218 and 220, the overlay server can provide the client devices 218 and 220 with the overlay content and the client devices 218 and 220 can display the overlay content.

The client device 218 or 220 can send a request to an overlay decision engine 210 requesting a media content overlay. In one example, the request can include a media content identifier (ID). In another example, the request can include overlay information or overlay parameters (as discussed in the proceeding paragraphs). In one example, the overlay decision engine 210 can use the content ID, the overlay information, the overlay parameters, or a combination thereof to identify targeted overlay content. In another example, the overlay decision engine 210 can use the content ID, overlay information, overlay parameters, or a combination thereof to identify an overlay format (as discussed in the proceeding paragraphs). The overlay decision engine 210 can compare the content ID, overlay information, overlay parameters, or a combination thereof with an overlay database 208 to identify the targeted overlay content and the overlay format.

In one example, the overlay database 208 can be updated, by the content provider 202 or an advertiser, with new overlay content on a periodic or continuous basis. In one example, the overlay database 208 can be updated, by the content provider 202 or an advertiser, with overlay formats on a periodic or continuous basis. When the overlay decision engine 210 identifies the targeted overlay content, the overlay decision engine 210 can return targeted overlay information to the client device 218 or 220, including reference information that references the overlay server 212. The reference information can include information identifying a location of a content overlay at the overlay server 212 and information local to the client device 218 or 220. The client device 218 or 220 send the reference information to the overlay server 212 and the overlay server 212 can identify and send the targeted overlay content to the client device 218 or 220.

In one embodiment, the overlay server 212 can deliver the format information to the client device 218 or 220 independent of the overlay content. In this embodiment, the client device 218 or 220 can receive the overlay content and format the overlay content using the format information, such as populating a template already positioned as an overlay on top of the media content, for example. In another embodiment, the overlay server 212 can format the overlay content using the format information and deliver formatted overlay content to the client device 218 or 220 as a combined package of template and overlay content to directly be displayed over the media content. In another embodiment, the overlay server 212 can use the reference information to dynamically deliver localized or tailored messages to the client devices 218 or 220.

In one example, the overlay server 212 can deliver the targeted overlay content directly to the client device 218 or 220, such as via a wireless communications network. In another example, the overlay server 212 can communicate the targeted overlay content to the client device 218 or 220 via a universal resource locator (URL). The management engine 206 can associate the overlay content or the overlay format with the URL, where the URL can indicate a source location of the overlay content and the format of the overlay. The overlay decision engine 210 can communicate the URL to the client device 218 or 220 and the client device 218 or 220 can retrieve the overlay content or the overlay format from that URL.

In one example, when multiple targeted overlay contents match the content ID, the overlay information, the overlay parameters, or a combination thereof, the overlay decision engine 210 can select the targeted content overlay that meets a greatest number of parameters and information. In another example, when multiple targeted overlay contents match the content ID, the overlay information, the overlay parameters, or a combination thereof, the overlay decision engine 210 can randomly select an overlay content that meets the parameters or the other information. In another example, when multiple targeted overlay contents match the content ID, the overlay information, the overlay parameters, or a combination thereof, the overlay decision engine 210 can select predetermined overlay content that matches other content ID, overlay information, or overlay parameters. The overlay content can be populated with dynamic content (e.g., content that can be updated or refreshed at periodic intervals).

The client devices 218 and 220 can superimpose overlay content over the content feed when stored frame fingerprints match a client fingerprint, e.g., a sequence of frames having corresponding time stamps. In one example, the client devices 218 and 220 can superimpose overlay content over the content feed in a hypertext markup language (HTML) browser. In another example, the client devices 218 and/or 220 can superimpose alternative video over the content feed. In another example, the client devices 218 and 220 can superimpose overlay content over a content feed from an OTA broadcaster or a cable broadcaster. When the overlay content is placed over the content feed, the overlay content can be displayed to the user via a display of the client devices 218 and 220. In one example, the overlay content can include one or more call to actions options that can be displayed to a user. In this example, the user can interact with the overlay content using an input device (such as a TV remote, keyboard, a smartphone, or a tablet) to create feedback information. Another individual, such as an advertiser, can access the feedback information and analyze the feedback information to determine desired information, such as user interest in the overlay content.

In one example, the client devices 218 and 220 can monitor the content feed to determine when the overlay content and content feed match ceases. In another example, the client devices 218 and 220 can monitor the content feed to determine when a threshold period of time expires. In one example, when the threshold period of time expires, the client device 218 or 220 can cease to superimpose the overlay content for display on the client device 218 or 220.

In one example, the overlay decision engine 210 can also analyze the event information to determine viewing data. The viewing data can include: channel information indicating what media content the first client device or the second client device can have displayed; duration information indicating a period of time the first client device or the second client device displayed the media content; or user command information specifying a command received from a user device. The overlay decision engine 210 can store the viewing data in the viewing database 216. In one example, the viewing database can receive information from the client device 218 or 220 via the overlay decision engine 210. In another example, the viewing database can also receive information from the ACR system 224 or the ACR system 226 via the data engine 230. The ACR systems 224 and 226 can communicate data regarding what client devices 218 and 220 have displayed to the data engine 230. The data engine can store the viewing data in the viewing database 216. The viewing data in the viewing database 216 can also be augmented with additional data from a third party external database 228. For example, the viewing data in the viewing database 216 can be matched with a demographic database from a third party to augment the viewing data in the viewing database 216 with demographic data.

In one example, the overlay decision engine 210 can receive user interaction information from the client device 218 or 220. The user interaction information can include information indicating how a user interacts with the client devices 218 and 220, such as pausing a program, changing a TV channel, muting the client devices 218 and 220, and so forth. In another example, the overlay decision engine 210 can receive user feedback information from the client device 218 or 220. The user feedback information can include user input information indicating a user reaction to a content overlay, such as content overlay like or dislike information or a request for additional information for a product or service shown in a content overlay. The overlay decision engine 210 can store the user interaction information or user feedback information in the viewing database 216.

The ACR systems 224 and 226 can provide viewing data in different formats and via different communication schemes including, but not limited to: direct beaconing of each individual viewing event; direct beaconing of batched viewing events; file based transfer of batched viewing events, such as file transfer protocol (FTP), secure FTP (SFTP), or Amazon simple storage service (Amazon S3®); or other file transfer protocol. The data engine 230 can normalize the viewing data that is received in different formats from the different ACR systems 224 and 226. The data engine 230 can store the normalized viewing data in the viewing database 216. The reporting engine 214 can query the data engine 230 to retrieve subsets of data from the viewing database 216. The reporting engine 214 can process and analyze subsets of viewing data to create reports about content viewing behavior across client devices 218 and 220 and from ACR technology vendors associated with the client devices 218 and 220.

In one example, the data engine 230 can receive viewing data from the ACR system 224, the ACR system 226, or a combination thereof, normalize the viewing data and store it in the viewing database 216. In another example, the data engine 230 can retrieve viewing data from the viewing database 216. The data engine 230 can send the viewing data to the reporting engine 214. The reporting engine 214 can aggregate the viewing data and can create reports based on the aggregated viewing data to send to a user device 204.

Figure 3:
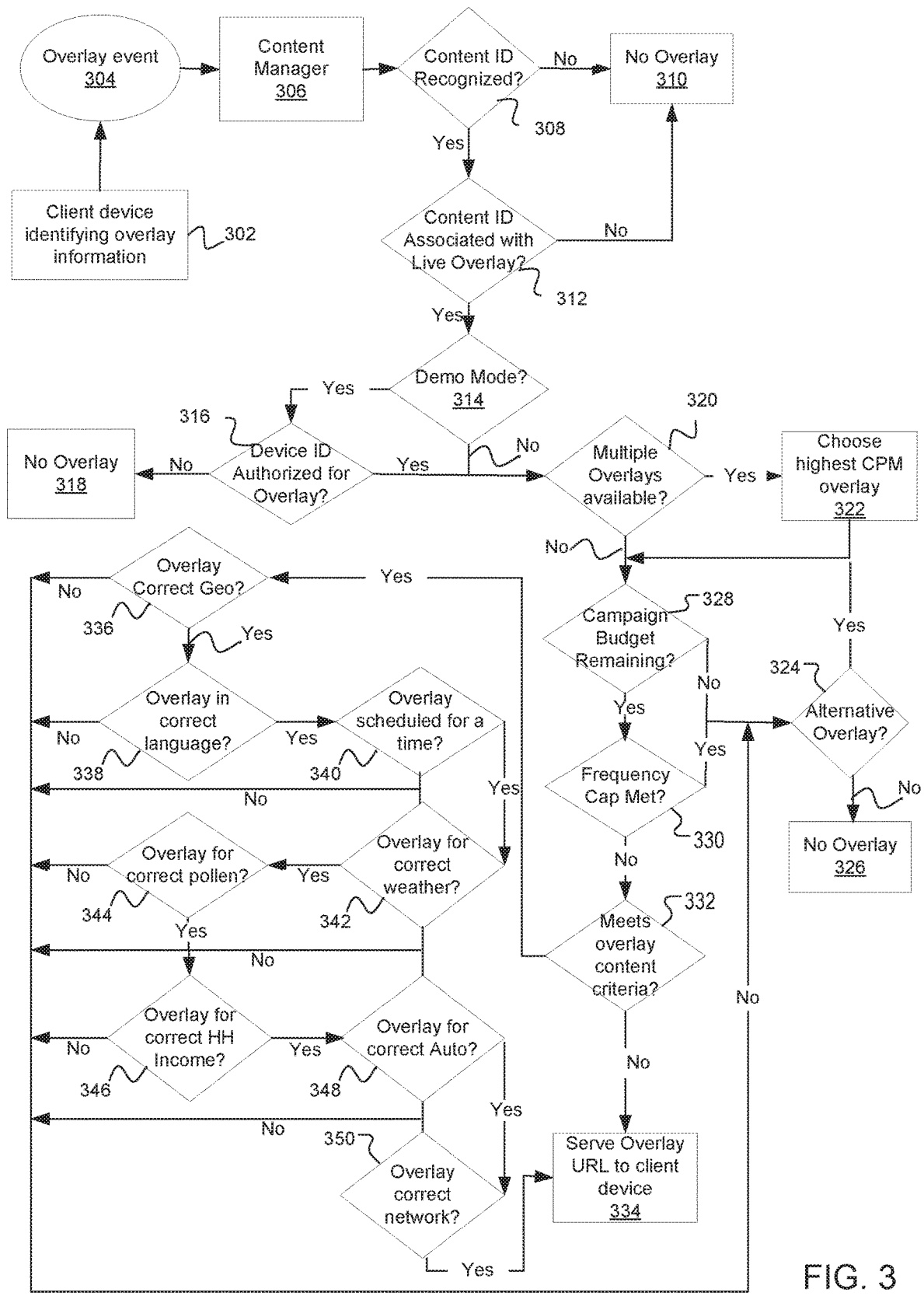
FIG. 3 illustrates a flow chart for providing an overlay to a client device according to one embodiment.

FIG. 3 illustrates a diagram of a method 300 of the content manager providing an overlay to a client device according to one embodiment. The method 300 may be at least partially performed by processing logic that may include hardware (e.g., circuitry, dedicated logic, programmable logic, microcode, etc.), software (e.g., instructions executed by a processing device), firmware or a combination thereof. The method 300 may be performed by processing logic of the content manager 122 or the computing system 128 of FIG. 1.

Referring to FIG. 3, the method 300 begins with a client device identifying overlay information (302). The method can also include communicating that overlay information to the content manager via an overlay event (304). For example, the overlay information can include an identifier of the content that has been detected via ACR; a time offset into the identified content; an internet protocol (IP) address; a location of the client device; a language setting of the client device user interface; or a language of a local content feed received at the client device. For example, the client device can send a request to receive a content overlay via an overlay event, such as when the client device detects that an advertisement may be displayed on the client device. The request can be communicated to processing logic of the content manager (306). The processing logic can select overlay content based on the request. The processing logic can begin to select the overlay content by determining when the request contains a content identifier (ID) (308).

In one example, the request does not contain a content ID (e.g., an ID identifying a type of overlay content). When the request does not contain the content ID, no overlay content may be selected (310). In this example, when no overlay content is selected, the client device can continue to display the content feed without overlay content.

In another example, the request does contain a content ID. When the request does contain the content ID, the processing logic can determine whether the content ID is associated with a live overlay (312). A live overlay can be an overlay (in an overlay database) that is associated with a content ID and may be readily available to be used. For example, a live overlay may be an overlay that has not been turned off or designated by the processing logic as inactive or turned off.

In one embodiment, if the content ID is not associated with a live overlay, no overlay content may be selected (310). When no overlay content is selected, the processing logic can continue to display the content feed without overlay content.

In another embodiment, the content ID is associated with a live overlay. When the content ID is associated with the live overlay, the content manager can determine when the request indicates to display an overlay content in a demo mode (314). The demo mode can be a restriction on the overlay that can be set by the processing logic.

In one embodiment, the request indicates not to display overlay content in the demo mode. When the demo mode is not select, the processing logic can continue to process the overlay event and can determine when multiple overlays may be available (320).

In another embodiment, the request indicates to display overlay content in the demo mode. In this embodiment, the processing logic can determine whether a device ID of the request indicates that client device is compatible or authorized to display overlay content, e.g., compatibility information (316). For example, the restriction can be to limit overlay content to being used on designated (whitelisted) media consumption devices for demonstration or preview uses. The compatibility information can indicate if the client device is a whitelisted media consumption device.

In one embodiment, the device ID of the request indicates that device may not be authorized to display overlay content. When the device ID of the request indicates that device may not be authorized, no overlay content may be selected (318). When no overlay content is selected, the processing logic can continue to display the content feed without the overlay content.

In one embodiment, the device ID of the request indicates that client device may be authorized to display overlay content. When the client device may be authorized to display overlay content, the processing logic can determine when multiple overlays may be available (320). In another embodiment, the device ID of the request indicates that the overlay request indicates not to display overlay content in a demo mode. When the device ID indicates that the overlay request indicates not to display overlay content, the processing logic can determine when multiple overlays may be available (320).

In one embodiment, the multiple overlay content is available to display on the client device. When the multiple overlay content is available, the content manager can choose content with a highest cost per mille (CPM) overlay (322). In one example, when the content manager chooses content with a highest CPM overlay, the processing logic can determine when a budget remaining amount associated with overlay content exceeds a threshold amount (328). In another example, when multiple overlays may not be available, the processing logic can determine when a budget remaining amount associated with overlay content exceeds a threshold amount (328). For example, budget remaining amount associated can exceed the threshold amount when an advertiser has made payment to an administrator of the content manager to display overlay content.

In one embodiment, the budget remaining amount associated with overlay content does not exceed a threshold amount. When budget remaining amount does not exceed the threshold amount, the processing logic can determine when alternative overlay content may be available (324).

In one example, the alternative overlay content is not available. When alternative overlay content is not available, no overlay content may be selected and the client device can continue to display the content feed without overlay content (326). In another example, the alternative overlay content is available. When the alternative overlay content is available, the processing logic can return to 328.

In another embodiment, the budget remaining amount associated with overlay content exceeds the threshold amount. When the budget remaining amount exceeds the threshold amount, the processing logic can determine whether a frequency threshold or cap has been reached (e.g., when a threshold amount of overlay content has been displayed to a viewer) (330).

In one example, the frequency cap is reached. When the cap is reached, the processing logic can return to 324. In another example, when the frequency cap is not reached, the processing logic can determine whether the request includes a condition for the overlay content to meet overlay criteria (332).

In one embodiment, the request does not include a condition for the overlay content to meet overlay criteria. When the request does not include the condition, the processing logic can communicate a universal resource locator (URL) address to the client device (334). When the client device receives the URL address, the client device can access overlay content at the URL address and display the overlay content.

In another embodiment, the request does include a condition for the overlay content to meet overlay criteria. When the request does include the condition, the processing logic can determine overlay criteria included in the condition. The overlay criteria can include: content within a targeted parameter range, such as content matching demographic parameters, viewer age parameters, and so forth or content set for a geographic location (336); content set to a language of the client device user (338); content scheduled to be displayed within a period of time or at a time of day (340); content set to be displayed for a current weather condition (342); content set to be displayed for a threshold or defined pollen count (344); content set to be displayed for a threshold or defined household income (346); content set to be displayed for an automobile (348); content set to be displayed when the viewer is watching a selected content provider network (350).

In one example, when the viewer is watching a selected content provider network the processing logic can communicate a universal resource locator (URL) address to the client device (334). When the client device receives the URL address, the client device can access overlay content at the URL address and display the overlay content.

The overlay information (discussed in the preceding paragraphs) can include call-to-action options or restriction information. Typically, content overlay spots or slots (such as advertisement slots) in a local content feed can be sold in standardized formats. In one example, standardized advertisement formats or configurations can enable advertisers to conceptualize how the advertisements may appear and interact with viewers. In another example, standardized advertisement formats or configurations can enable advertisers to select a format or configuration of an advertisement from a menu of advertisement types. Advertisement networks and advertisement servers may also brand the advertisement formats or configurations to productize advertisement spots or slots offerings by the network.

The standardized advertisement formats or configurations can be used with different overlay formats. In one example, overlay parameters can be used by the processing logic to select different overlay formats. In one example, the processing logic can select the different overlay formats based on a content of the local content feed. In another example, the processing logic can select different overlay formats based on user information received from the client device. The overlay formats can include: an expanding overlay format; a synchronized overlay format; a template overlay format; a sequenced overlay format (e.g., different overlay content in a sequence); a video format; a restart video format; a broadcaster portal format; a microsite format, or a combination thereof. When the processing logic has selected the overlay format, the processing logic can format overlay content for the selected overlay format. For example, the processing logic can resize or reshape overlay content to fit the selected overlay format.

Figure 4:
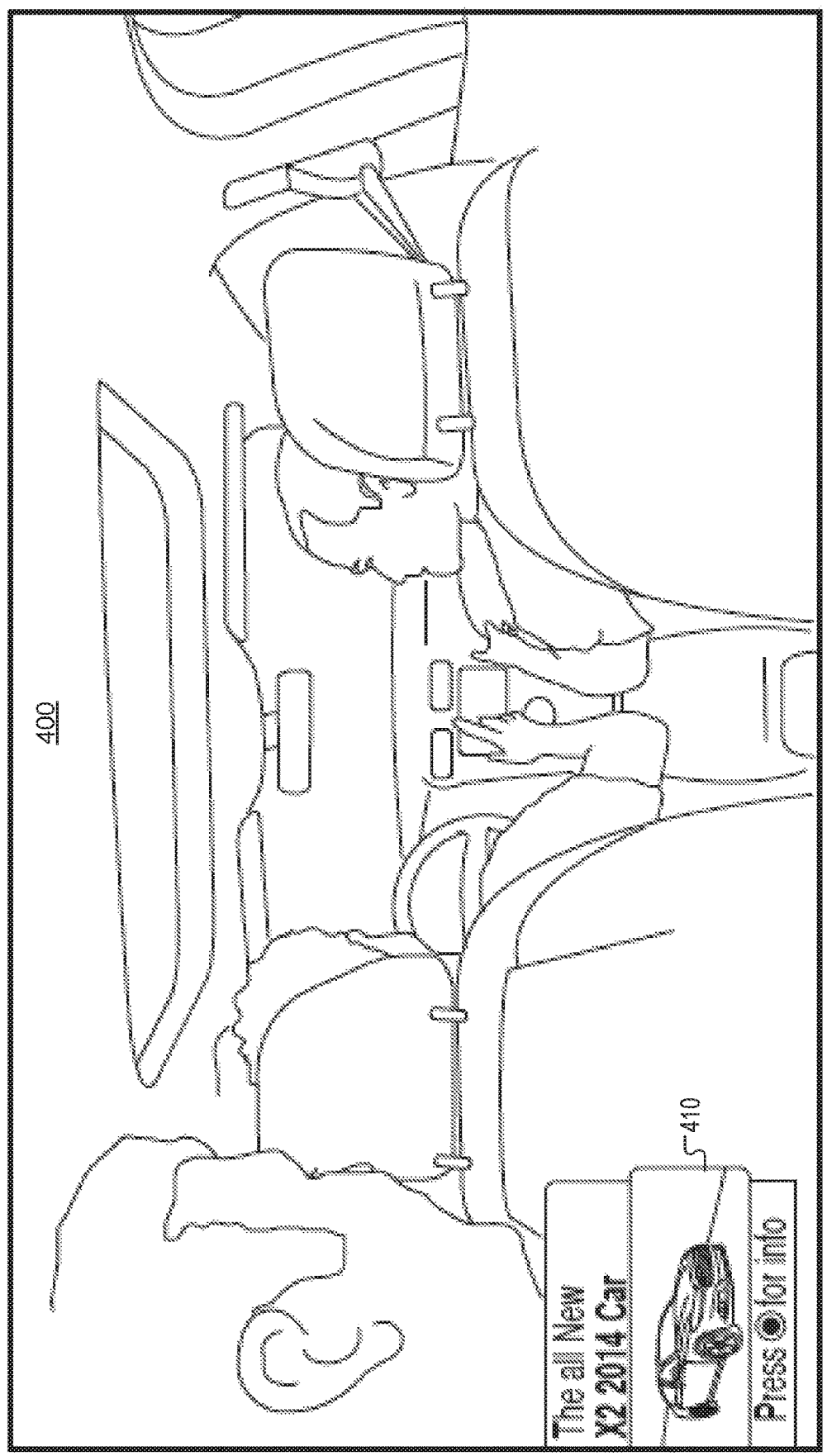
FIG. 4 illustrates an expanding overlay format for an overlay superimposed on media content according to one embodiment.

FIG. 4 illustrates an expanding overlay format for an overlay 410 (such as an advertisement) superimposed on a content feed 400 according to one embodiment. An overlay decision engine 210 (FIG. 2) can receive user information form an input device (such as a remote control) and initiate the overlay to show more information. For example, as illustrated in FIG. 4, the overlay 410 prompts the user to push a specific button on the remote control to initiate the overlay. Overlay 410, as illustrated, is a car commercial with an expandable overlay to show additional details for the car. Alternatively, in other embodiments, the overlay 400 can be used to show additional or different information.

In another example of the overlay formats, the overlay decision engine 210 can use a synchronized overlay (not shown) to tie specific overlay animations or transitions with underlying media content. For example, the overlay decision engine 210 can pass a timestamp into an overlay enabling for logic or other actions to be performed at selected timestamp triggers.

Figure 5:
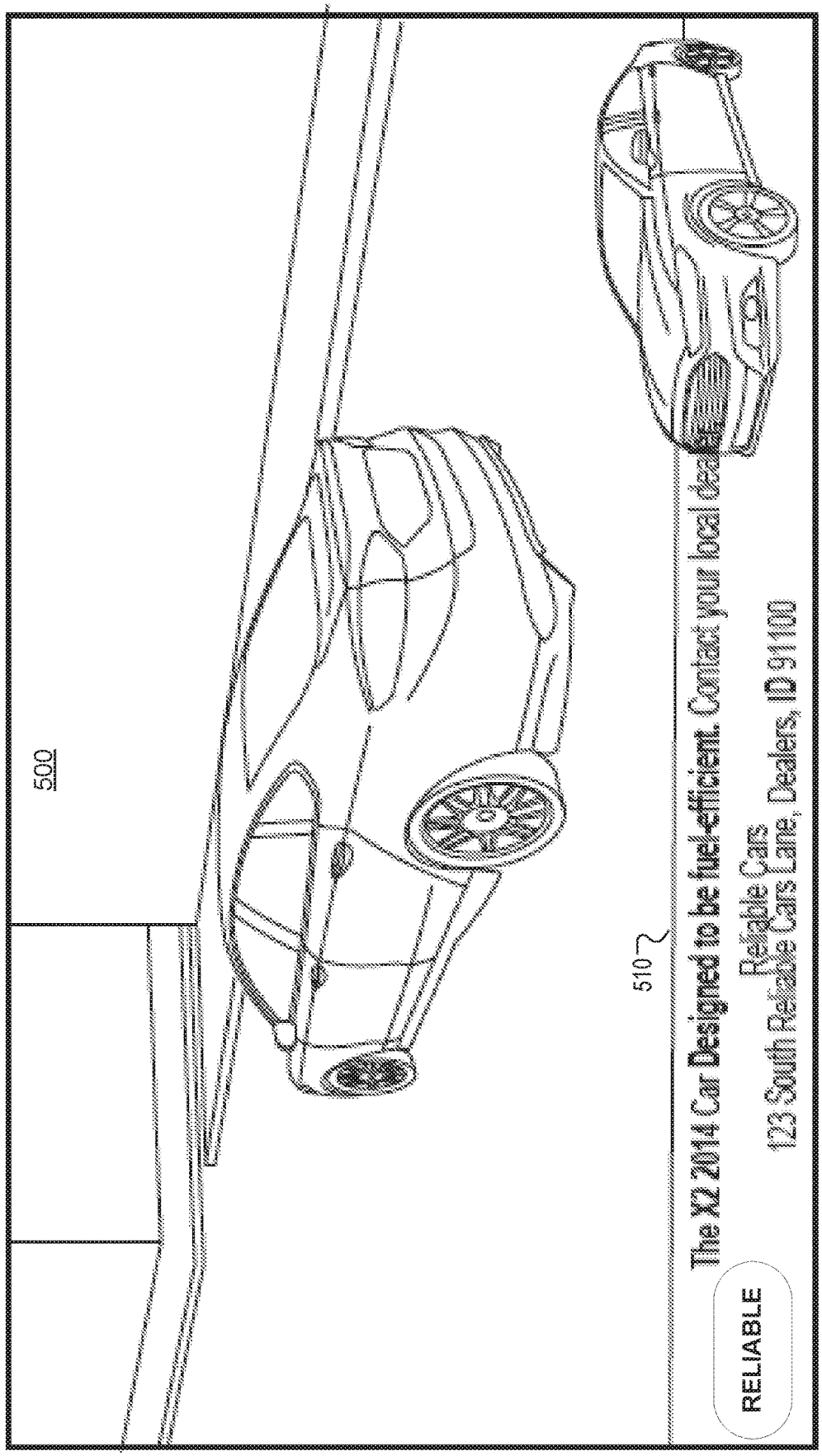
FIG. 5 illustrates a template overlay format for an overlay superimposed on media content according to one embodiment

FIG. 5 illustrates a template format for an overlay 510 superimposed on a local content feed 500 (such as an advertisement) according to one embodiment. The template overlay can be a template with field or locations, and the overlay decision engine 210 can fill in the template with personalized or localized information. In one example, the overlay decision engine 210 can retrieve the personalized or localized information from a database. In another example, the overlay decision engine 210 can receive the personalized or localized information from an input device. The template fields or locations can be created and populated with personalized or localized information by matching request parameters with external data. Overlay 510 is a car commercial with a template overlay to show additional details for a local car dealership, in this embodiment. Alternatively, the overlay 510 can be used to show other customized information.

In another example of the overlay formats, the overlay decision engine 210 can use a sequenced format (not shown) to display different overlays, for the same media content, on a client device, such as a TV device, in a selected order. For example, the overlay decision engine 210 can build up a story with the different overlays, independent of the media content, by using sequence information associated with the media content. An advantage of the template overlay can be to provide personalized and relevant overlays with a minimal set up effort by a user (such as an advertiser). The sequenced overlay format can direct the client device 218 or 220 to display a plurality of media frames (or groups of frames) of targeted overlay content in a sequence.

In another example of the overlay formats, the overlay decision engine 210 can use a video format to display alternate video content to the media content being played in an underlying broadcast by delivering an alternate video (or by signaling the overlay server 212 to deliver the alternate video) to the client device 218 or 220 that targets interests of a user of the client device. The alternate video can be scaled within surrounding graphical content or can be played full-screen. In one example, the overlay decision engine can replace a generic broadcast TV advertisement with a targeted full-screen video advertisement streamed over the Internet. The overlay decision engine 210 can direct the client device 218 or 220 to display video content.

In another example of the overlay formats, the overlay decision engine 210 can use a restart format to display an overlay that is specific to the underlying broadcast TV show. The overlay decision engine can receive user input (such as a press of a button on a TV remote control) and expand the overlay into an overlay that restarts the current broadcast TV show from the beginning. The overlay decision engine 210 can restart the TV show from the beginning by receiving encoded video of the TV show streamed over the Internet or other network. In one example, when the user restarts the current broadcast TV show, the overlay decision engine 210 can receive user input (e.g., from a press of a button on a TV remote or a keyboard), analyze the user input, and communicate a display restart instruction to client device. The display restart instruction can instruct the client device to restart displaying the media content from a beginning of the media content. The restart overlay can include play controls that allow play, pause, fast-forward, rewind and exit. The restart format can direct the client device to display an overlay with playback controls.

In another example of the overlay formats, the overlay decision engine 210 can use a broadcaster portal format to display an overlay that is specific to the underlying broadcast channel or from which to display content received from a content provider. For example, when a broadcaster has a local news show, then the broadcaster portal available at the time of the local news show could show breaking news stories, related news stories, archived new stories, traffic news, weather news, and so forth that can be associated with the local news show.

The overlay decision engine 210 can receive user input (such as a user pressing a button on their TV remote control) to expand the overlay into a full-screen interactive broadcaster portal. The expanded broadcaster portal overlay can contain textual, graphical, image and video content from the broadcaster of the channel that the user can browse and play. The overlay decision engine 210 can send a broadcaster portal instruction to the client devices to direct the client device to display overlay content received from a content provider.

Figure 6A:
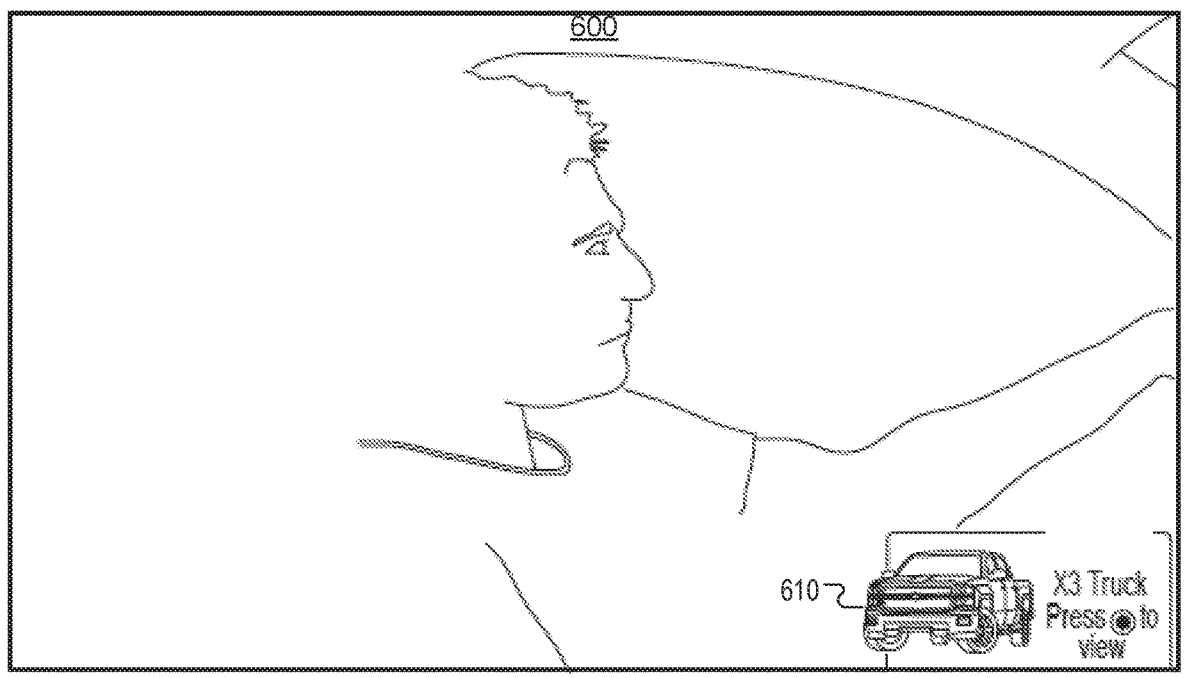
FIG. 6A illustrates a microsites overlay format for an overlay superimposed on media content according to one embodiment.

FIG. 6A illustrates a microsite overlay format for an overlay 610 (such as an advertisement) superimposed on a local content feed 600 according to one embodiment. The overlay decision engine 210 can use a microsite format to switch from an overlay to a full screen experience. For example, the microsite overlay can have a microsite that can be selected to telescope out to a full screen experience (e.g., a telescoping overlay). The telescoping overlay can use video-on-demand as the overlay. In this example, a viewer can click on a microsite that displays a summary or abbreviated view of an overlay and the overlay decision engine 210 can telescope to a discreet video-on-demand stream from a server, such as a server of a cable provider or a multichannel video provider.

Figure 6B:
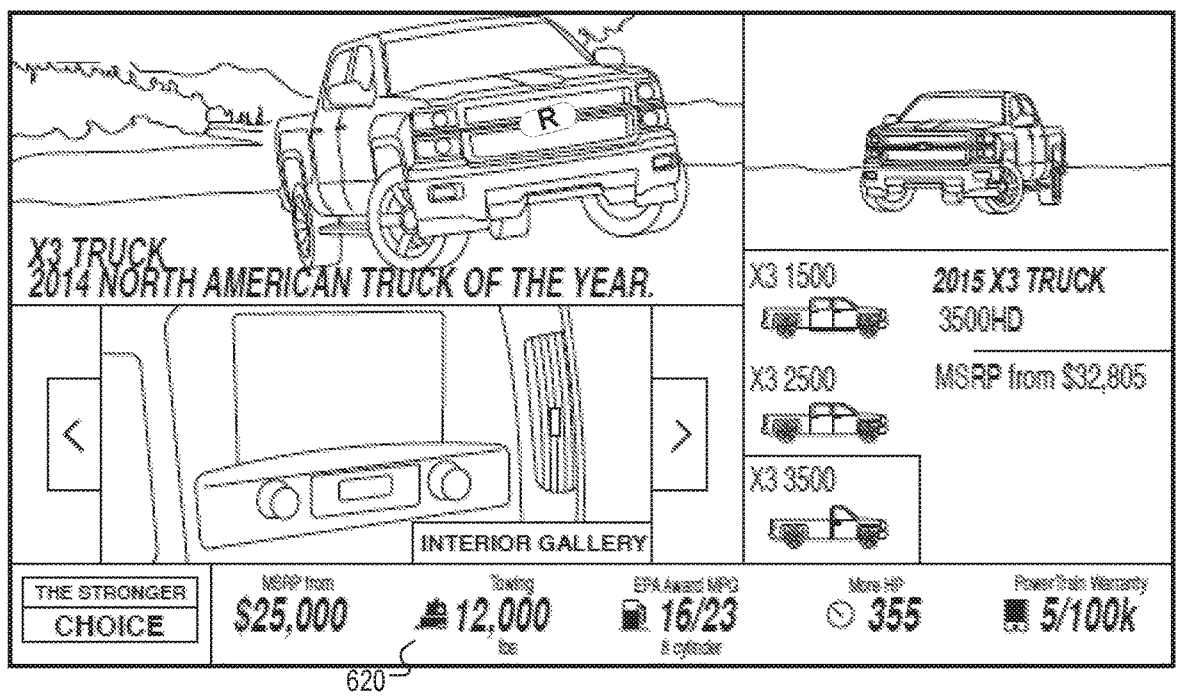
FIG. 6B illustrates a full screen experience of a microsite overlay format for an overlay superimposed on media content according to one embodiment.

FIG. 6B illustrates a full screen experience of a microsite overlay format for an overlay 620 superimposed on a local content feed according to one embodiment. In one example, the local content feed, such as a video stream, can be dismissed when the overlay is in a full screen mode. In another example, the media content form a provider can be shown as a Picture-in-Picture (PiP) while the overlay content is displayed on the remainder of the screen.

In another example, the request (as discussed in the preceding paragraphs) can include targeting parameters or configuration parameters, where the overlay decision engine 210 can use the targeting parameters to focus or restrict an overlay content selection. Overlay content can have a digital format and can be used for a variety of targeting capabilities. For example, the targeting information can include: language targeting information; weather targeting information; time of day targeting information; viewing history targeting information; demographic targeting information; geographic targeting information; pollen level targeting information; overlay channel targeting information; or overlay show targeting information.

Figure 7:
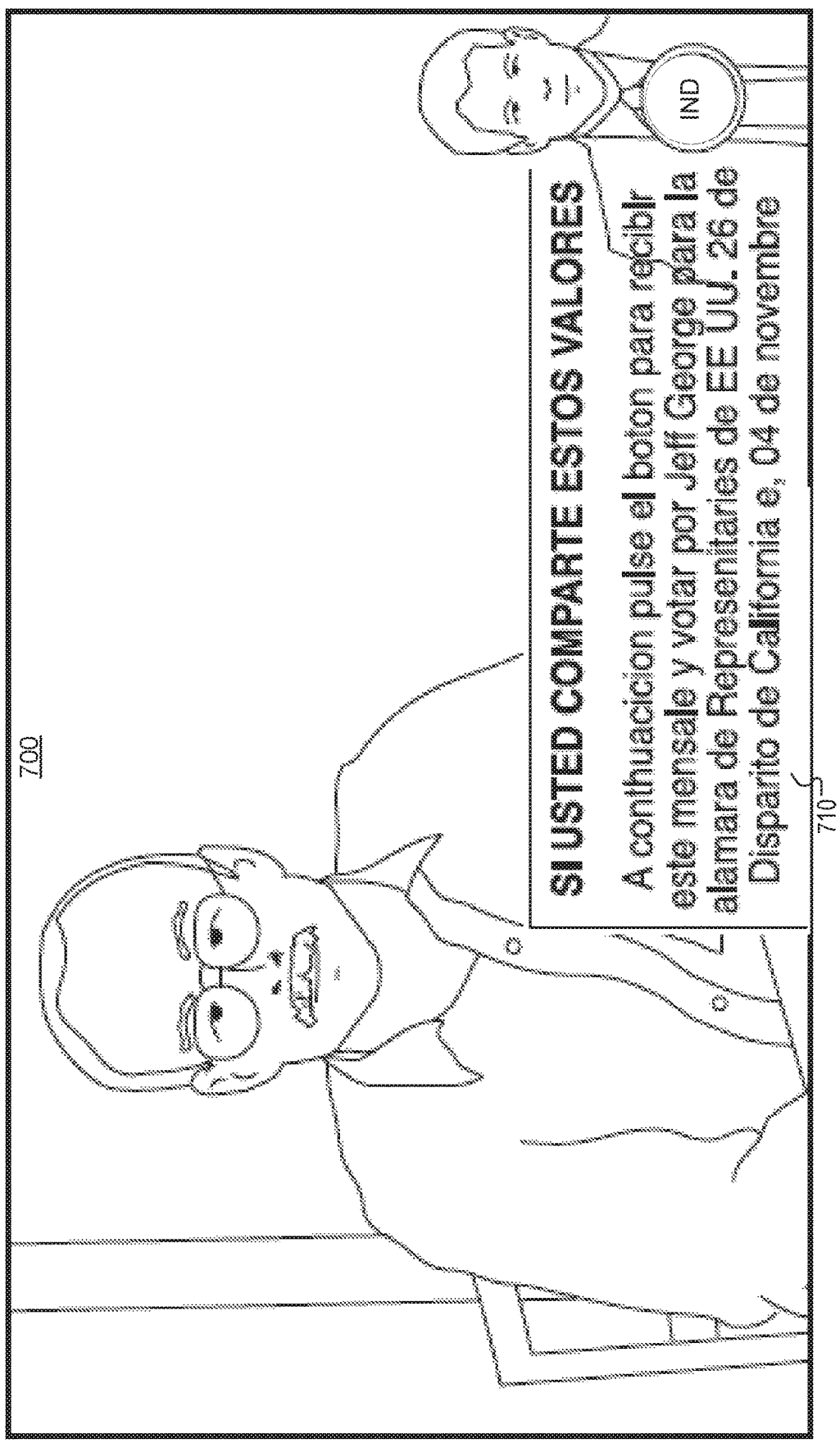
FIG. 7 illustrates targeting information for an overlay superimposed on media content that includes language information according to one embodiment.

FIG. 7 illustrates targeting information for an overlay 710 superimposed on a local content feed 700 that includes language information according to one embodiment. In one example, when the overlay decision engine 210 uses the overlay content, the overlay decision engine 210 can format or select an overlay content in view of a language setting of a client device displaying the overlay content and the local content feed 700, such as a TV language setting. In another example, the overlay decision engine 210 can format or select the overlay content in view of a language setting of the client device regardless of a language of the local content feed 700. In another example, the overlay decision engine 210 can select the overlay content in view of a language setting of the client device displaying the overlay content and local content feed 700.

Figure 8:
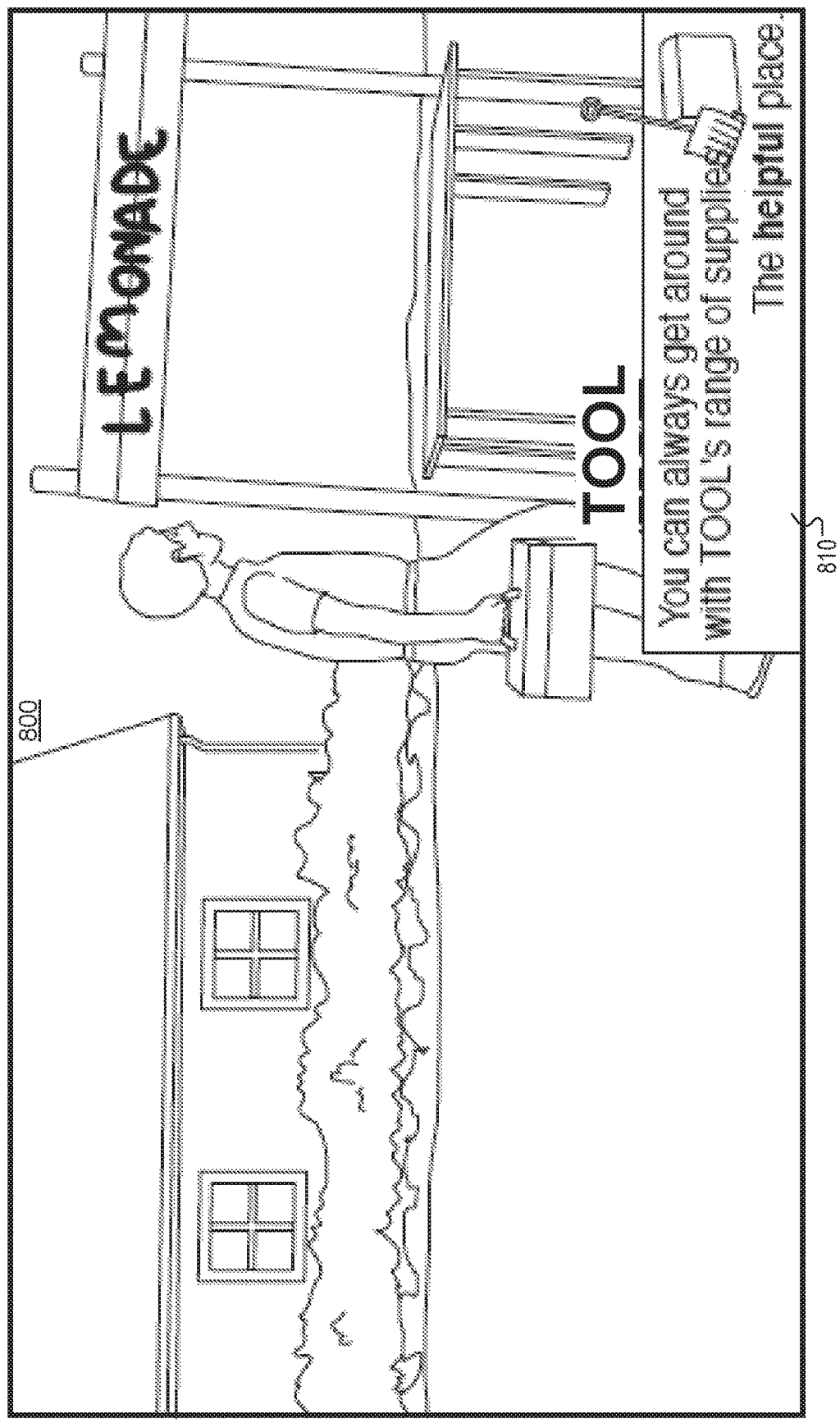
FIG. 8 illustrates targeting information for an overlay superimposed on media content that includes weather information according to one embodiment.

FIG. 8 illustrates targeting information for an overlay 810 superimposed on a local content feed 800 that includes weather information according to one embodiment. In one example, the overlay decision engine 210 can use weather conditions of a place where a viewer is located as a parameter in selecting overlay content. For example, a first overlay can initially be selected that matches the local content feed 800 and then a different overlay content can be selected and used in view of a current weather condition or a forecasted weather condition for the location of the viewer. Overlay 810, as illustrated, is a tool commercial when weather in an area of a viewer is sunny and the viewer can do work outdoors.

Figure 9:
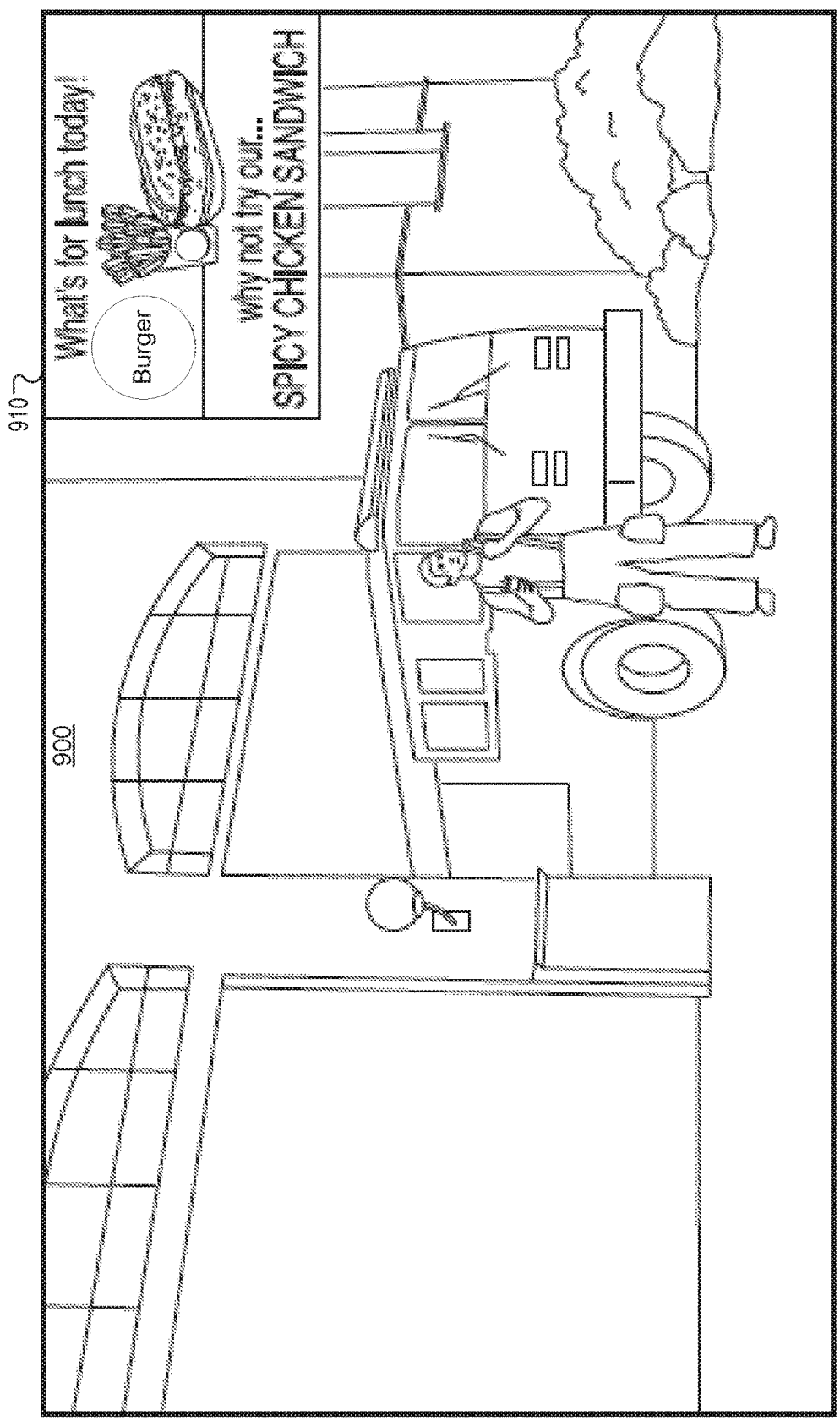
FIG. 9 illustrates targeting information for an overlay superimposed on media content that includes time-of-day information according to one embodiment.

FIG. 9 illustrates targeting information for an overlay 910 superimposed on a local content feed 900 that includes time-of-day information according to one embodiment. In one example, the overlay decision engine 210 can use time of day as a parameter to select overlay content. For example, a first overlay can initially be selected that matches a local content feed and then a second overlay content can be selected in view of what time of the day it is when a viewer can view the overlay content.

The types of information discussed in the preceding paragraphs are not intended to be limiting. The overlay decision engine 210 can use a variety of different types of information to build user profiles and make decisions. For example, the overlay decision engine 210 can further use a viewing history for targeting to build a profile of what content of a local content feed, such as television programs, a device displays or a viewer watches and use type of viewer as a parameter for a targeting option. For example, a first content overlay can initially be selected that matches the local content feed and then a second overlay content can be selected and used in view of the type of viewer detected. In one example, a sporty viewer can receive a sports content overlay and a cookery viewer can receive a cookery content overlay for a same supermarket video commercial. In another example, the overlay content can be selected in view of the type of viewer detected or set as a parameter.

For demographic targeting, the overlay decision engine 210 can use a demographic profile of a user to select the overlay content. In one example, a first content overlay can initially be selected that matches content of a current local content feed and then a second overlay content can be selected in view of an age of the user ranging between 20-25 years old. Demographic targeting parameters can include sex, age, income, marital status, household size, education, home ownership, household value and other such parameters that describe characteristics of a user.

For geographic targeting, the overlay decision engine 210 can use a geographic location of the overlay device to select the overlay content. In one example, a first content overlay can initially be selected that matches content of a current local feed and then a second overlay content can be selected in view of the overlay device being geographically located at a specific or approximate location.

For pollen level targeting, the overlay decision engine 210 can use the geographic location of the overlay device to determine the pollen level at the same location, which can be used to select the overlay content. In one example, a first content overlay can initially be selected that matches content of a current local feed and then a second overlay content can be selected in view of the pollen level at the specific or approximate geographic location of the overlay.

For overlay channel targeting, the overlay decision engine 210 can use an actual channel of the local content feed as a parameter to select the overlay content. In one example, a first content overlay can initially be selected that matches content of a current local content feed and then a second overlay content can be selected and used in view of the type of the channel the overlay can be displayed on.

For overlay show targeting, the overlay decision engine 210 can use a show that is or was previously used within an overlay request as a parameter to select the overlay content. For example, a first overlay can initially be selected that matches a local content feed and then a second overlay or different overlay content can be selected and used in view of a show genre or title.

In another example, the overlay information can include call-to-action options, where the overlay decision engine 210 uses such call-to-action options to display overlay content with which a user can interact, such as via a user interface. The call-to-action options can include, for example, configuration information for: a promotional codes option; a short codes option; a click-to-vote option; a click to buy option; a click to call option; a click to text option; a click to email option; a click to indicate a user response option; or a click to remind option. An advantage of the call-to-action options can be to enable local content feed providers or advertisers to engage with viewers at a deeper or fuller level and gain direct attribution from a content overlay campaign. In another example, the overlay information can include restriction information, where the restriction information can restrict overlay content selection.

Advertisers can include promotion codes within overlay content. The promotional codes can be a one-for-all format (e.g. the same format for each viewer) or unique per viewer format. In one example, the promotion codes can be targeted with the options, formats, or configurations discussed in the preceding and proceeding paragraphs, such as offering promotion codes in view of a location of a viewer. In another example, the content overlay system can be integrated with a promotion engine of an advertiser to generate promotional codes. Content overlay can include short codes. For example, a short code can be texting code or number in the overlay content to enable viewers to text a vote or donate funds for a specified cause.

The content overlay can include an option to vote, e.g. a click-to-vote option for the client device to display a voting interface. Overlay content with a click-to-vote option can offer one or multiple options (such as events, polls, questions, and so forth) that a viewer can vote on using an input device, such as a TV remote. In one example, the content overlay system can display a current result of the votes in real time. In another example, the content overlay system can display a current result of the votes after the votes have been cast. In another example, the content overlay system with the click-to-vote option can be integrated with a voting system of an advertiser.

The content overlay can include an option to buy through, e.g. a click to buy option. In one example, a click to buy option can be used with the short codes option, as discussed in the preceding paragraphs. In this example, a short code can be provided to a viewer for texting to a number to purchase a product or service. In another example, an advertiser can offer a buy capability via a client device, such as a smart TV. In this example, a viewer can link payment details of the viewer with the client device and the viewer can set up a PIN that authorizes payment. In this example, a viewer can link their payment details with the client device once and then a content overlay provider (such as an advertiser) can use the payment details when the viewer purchases a product or service or donates money. In another example, the content overlay system with the click to buy option can be integrated with a payment method of the client device, such as a payment method in the settings of the smart TV.

The content overlay can include an option for a viewer to request a call back, e.g. a click to call back option. For example, a viewer can select an option with an overlay content using an input device (such as a TV remote). In this example, the client device can communicate a predefined telephone number of a viewer or a viewer can provide a telephone number using the input device when the viewer has not previously entered their telephone number into the client device. In this example, when the client device or content overlay system verifies that the client device or content overlay system has access to the phone number, the viewer can request a call simply by communicating a PIN to a client device, such as via a TV remote.

In one example, the content overlay can include an option for a viewer to click to call option configuration information for the client device to display calling information or a call interface. In another example, the content overlay can include a click to text option configuration information for the client device to display texting information or a texting interface. In another example, the content overlay can include a click to email option configuration information for the client device to display an email interface. In another example, the content overlay can include a click to indicate a user response option configuration information for the client device to display an interface to receive a user response. In another example, the content overlay can include a click to remind option configuration information for the client device to display an interface to set a reminder.

Figure 10:
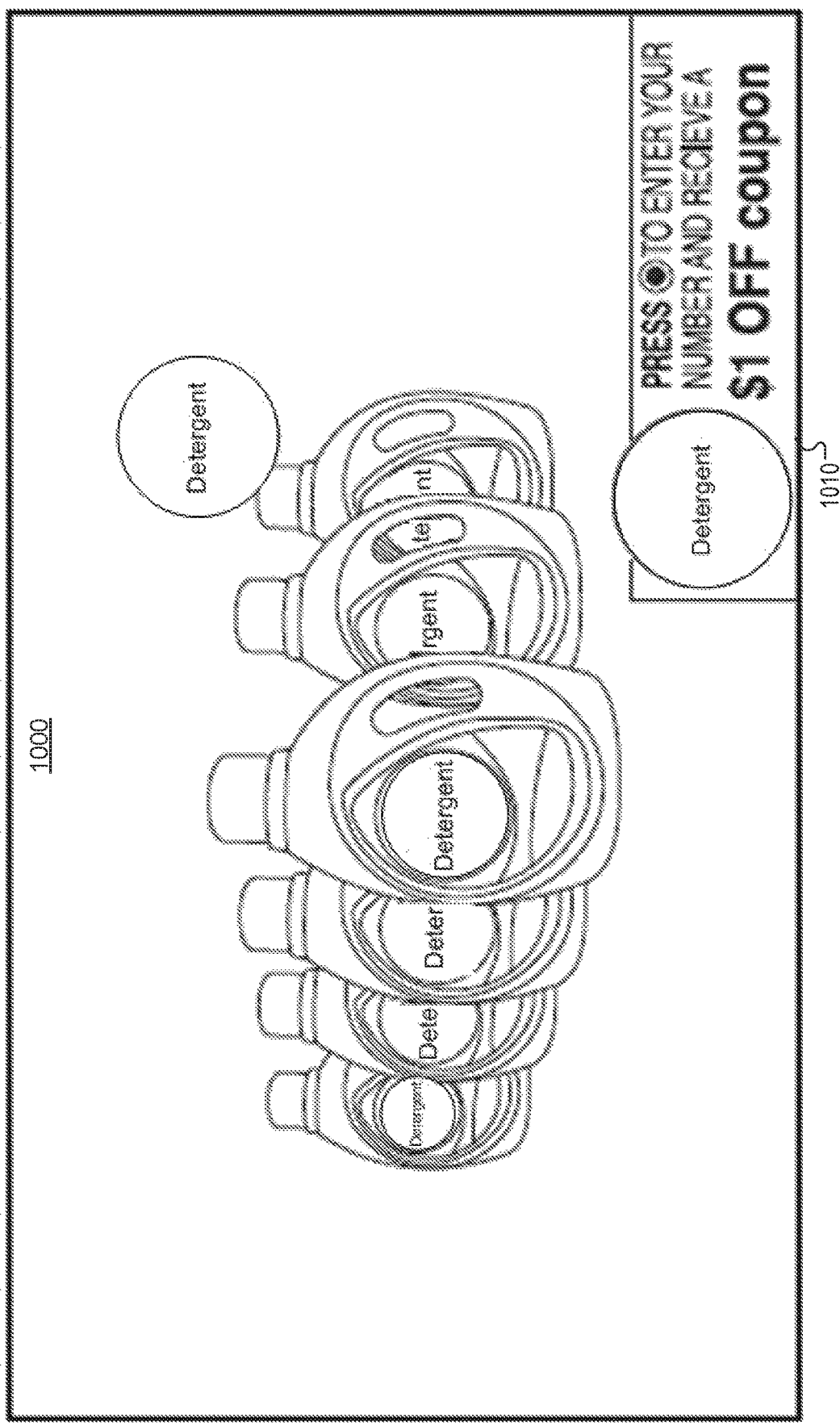
FIG. 10 illustrates a click to text option for an overlay superimposed on media content according to one embodiment.

FIG. 10 illustrates a click to text option for an overlay 1010 superimposed on a local content feed 1000 (such as an advertisement) according to one embodiment. Content overlay can include an option for a viewer to request a text back through the overlay 1010, e.g., a click to text option. In one example, a viewer can select an overlay option using an input device, such as a TV remote, to provide a phone number to a client device or a content manager (such as when the viewer has not previously provided the phone number). In this example, when the client device or the content manager verifies that the phone number, the viewer can request a text by entering a personal identification number (PIN) using an input device.

Content overlay can include an option for a viewer to request an email back through the overlay content, e.g., a click to email option. In one example, a viewer can select an overlay option, via an input device, to provide an email address or access to an email account to a client device or a content manager (when the viewer has not previously provided the email address or account information). In this example, when the client device or the content manager verifies the email account or email address, the viewer can request an email by entering a PIN using the input device.

Content overlay can include an option for a viewer to indicate a user response to a product or service, such as a Like® of a brand, product or other entity on Facebook® through the overlay content. In one example, a viewer can use an input device, such as a TV remote, to select a Like® option. When the viewer has not previously entered Facebook® login details into a client device, the viewer can be promoted to enter Facebook® login details at the client device. In this example, when a Facebook® login cookie is created, a viewer can Like a brand, product, or other Facebook® entity overlay using a single press of the input device.

Content overlay can include an option to set a reminder at a future time, e.g., a click-to-remind option. The reminder overlays cannot be linked to content recognition technology, and a client device or content overlay system can invoke and display the reminder at a time set by an advertiser, local content feed provider, or a viewer. In another example, a viewer can request a reminder through email or text message.

The content feed format information, call-to-action options, and targeting information can be used separately or in combination with the information, options, formats, or configurations discussed in the preceding paragraphs.

Figure 11:
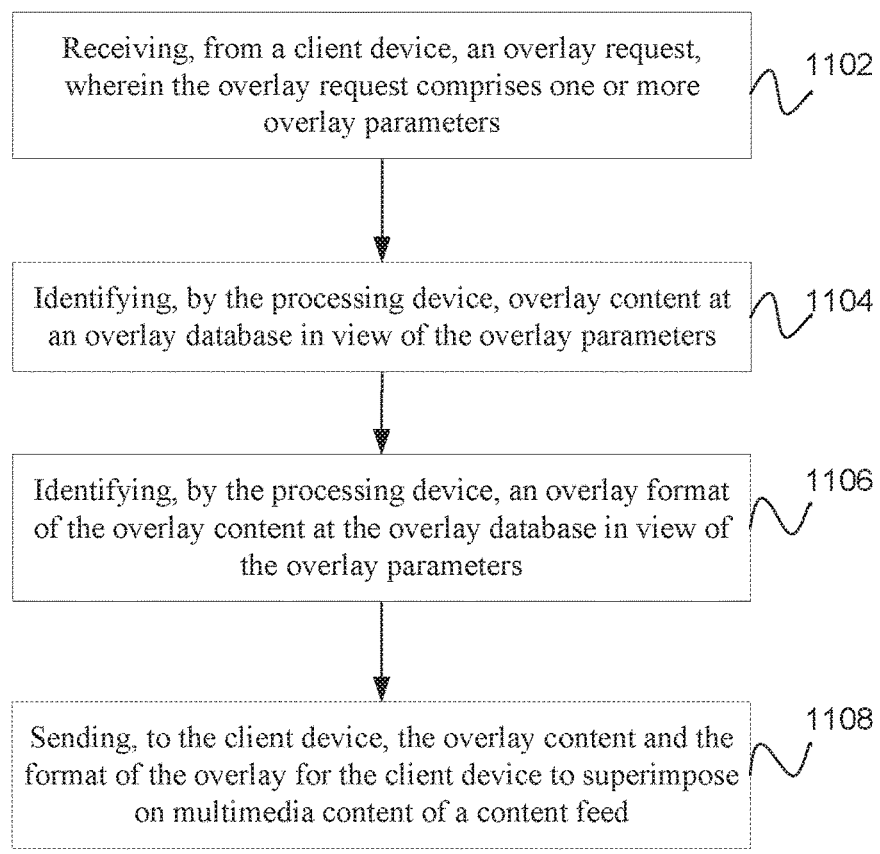
FIG. 11 illustrates a flowchart of a client device for overlaying advertisements on media content according to one embodiment.

FIG. 11 illustrates a diagram of a method 1100 of enhancing a content feed according to one embodiment. The method 1100 can be at least partially performed by processing logic that can include hardware (e.g., circuitry, dedicated logic, programmable logic, microcode, etc.), software (e.g., instructions executed by a processing device), firmware or a combination thereof. The method 1100 can be performed by processing logic of the content manager 122 or the computing system 128 of FIG. 1.

Referring to FIG. 11, the method 1100 begins with receiving, from a client device, an overlay request, where the overlay request includes one or more overlay parameters (1102). The method can further include determining, by the processing device, overlay content at an overlay database in view of the overlay parameters (1104). The method can further include determining, by the processing device, an overlay format of the overlay content at the overlay database in view of the overlay parameters (1106). A number of possible formats were discussed with reference to FIG. 3 and elsewhere herein. The method can further include sending, to the client device, the overlay content and the format of the overlay for the client device to superimpose on media content of a content feed (1108).

Figure 12:
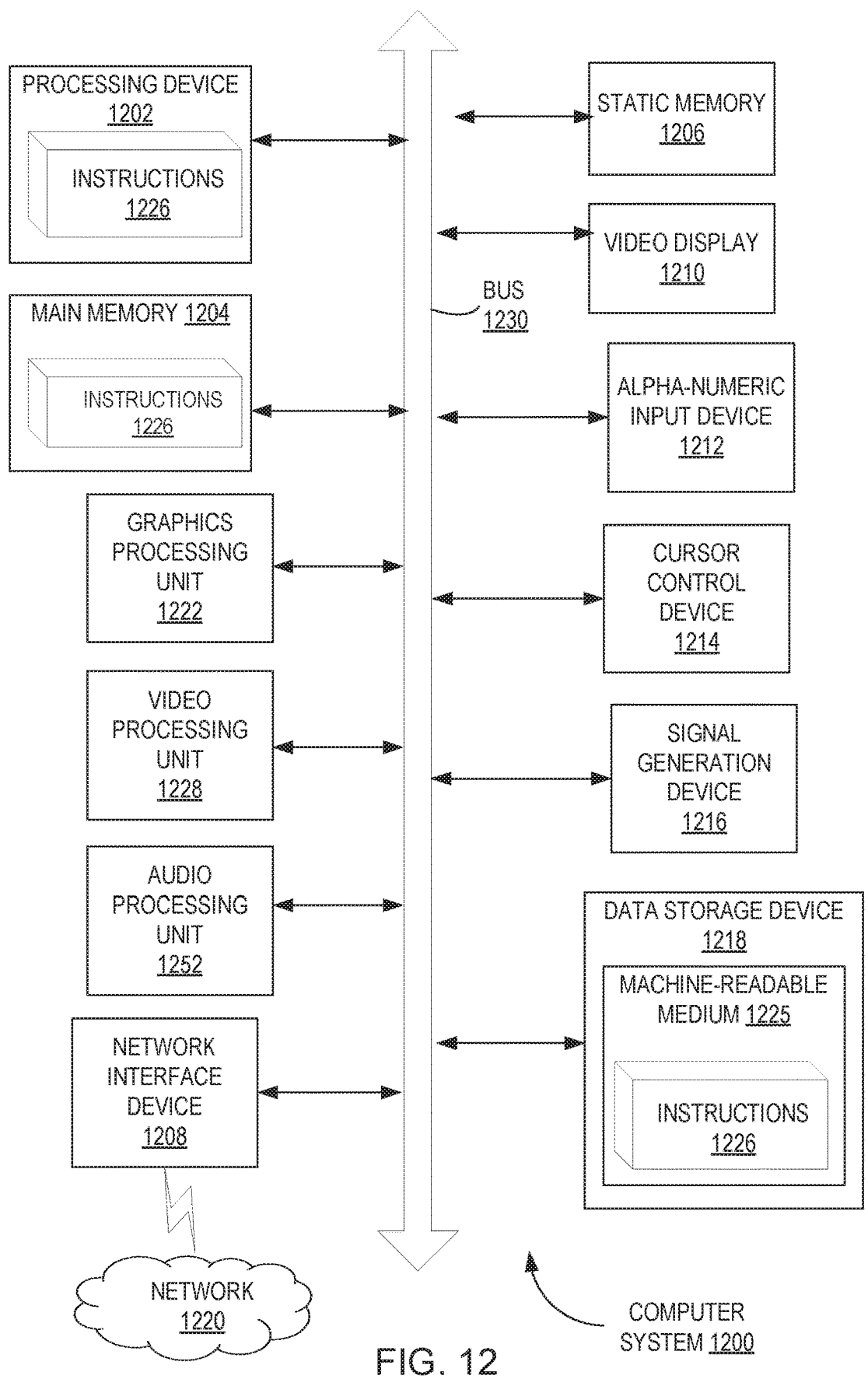
FIG. 12 illustrates a diagrammatic representation of a machine in the example form of a computer system within which a set of instructions, for causing the machine to perform any one or more of the methodologies discussed herein, can be executed.

FIG. 12 illustrates a diagrammatic representation of a machine in the example form of a computer system or a server device 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 may correspond to the computing system 128 of FIG. 1 or to the content manager 222 of FIG. 2. The computer system 1200 may correspond to at least a portion of a cloud-based computer system.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or more processing cores. The processing device 1202 may execute the instructions 1226 of a mirroring logic for performing the operations discussed herein.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computer system 1200 may include a graphics processing unit 1222, a video processing unit 1228, and an audio processing unit 1232. In another embodiment, the computer system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1225 on which is stored instructions 1226 embodying any one or more of the methodologies of functions described herein. The instructions 1226 may also reside, completely or at least partially, within the main memory 1204 and/or within the processing device 1202 during execution thereof by the computer system 1200; the main memory 1204 and the processing device 1202 also constituting computer-readable storage media.

The computer-readable storage medium 1225 may also be used to store instructions 1226 utilizing logic and/or a software library containing methods that call the above applications. While the computer-readable storage medium 1225 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions 1226 for execution by the machine and that cause the machine to perform any one or more of the methodologies of the present disclosure. The term "computer-readable storage medium" shall accordingly be taken to include, but not be limited to, solid-state memories, optical media, and magnetic media. The following examples pertain to further embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to secure memory repartitioning in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. It is described that the system may be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention may be applied to other types of circuits or semiconductor devices that may benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and may be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention may be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions may be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:
   receiving, by a server device and from a content provider, media content;
   receiving, by the server device and from a client device, an overlay request for overlay content to superimpose onto the media content;
   in response to receiving the overlay request, selecting, by the server device, respective overlay content from a database of overlay content;
   determining, by the server device, that an amount remaining in a monetary budget associated with the overlay request exceeds a threshold monetary budget, such that at least a necessary amount of monetary budget is available;
   determining, by the server device, that a number of times that the respective overlay content has been displayed does not exceed a threshold number of times; and in response to both (i) determining that the amount remaining in the monetary budget associated with the overlay request exceeds the threshold monetary budget and (ii) determining that the number of times that the respective overlay content has been displayed does not exceed the threshold number of times, causing, by the server device, the respective overlay content to be delivered to the client device.

2. The method of claim 1, wherein selecting the respective overlay content from the database of overlay content comprises selecting the respective overlay content based on the respective overlay content having a highest cost per mille (CPM) relative to other overlay content in the database of overlay content.

3. The method of claim 1, wherein determining that the number of times that the respective overlay content has been displayed does not exceed the threshold number of times comprises determining that the number of times that the respective overlay content has been displayed within a predefined time period does not exceed the threshold number of times.

4. The method of claim 1, wherein the overlay request includes overlay criteria, and wherein selecting the respective overlay content from the database of overlay content comprises using the overlay criteria as a basis for selecting the respective overlay content from the database of overlay content.

5. The method of claim 4, wherein the overlay criteria comprises at least one of: (i) demographic criteria, (ii) geographic location criteria, (iii) language criteria, (iv) time of day criteria, (v) weather criteria, (vi) pollen count criteria, or (vii) viewing history criteria.

6. The method of claim 1, wherein causing the respective overlay content to be delivered to the client device comprises:
   determining a source location of the respective overlay content; and
   communicating, to the client device, the determined source location for retrieval of the respective overlay content by the client device.

7. The method of claim 6, wherein the source location is identified by a universal resource locator (URL), and wherein communicating the determined source location to the client device comprises communicating the URL to the client device.

8. A non-transitory, computer-readable media having stored thereon program instructions that, when executed by one or more processors, cause performance of a set of operations comprising:
   receiving, by a server device and from a content provider, media content;
   receiving, by the server device and from a client device, an overlay request for overlay content to superimpose onto the media content;
   in response to receiving the overlay request, selecting, by the server device, respective overlay content from a database of overlay content;
   determining, by the server device, that an amount remaining in a monetary budget associated with the overlay request exceeds a threshold monetary budget, such that at least a necessary amount of monetary budget is available;
   determining, by the server device, that a number of times that the respective overlay content has been displayed does not exceed a threshold number of times; and
   in response to both (i) determining that the amount remaining in the monetary budget associated with the overlay request exceeds the threshold monetary budget and (ii) determining that the number of times that the respective overlay content has been displayed does not exceed the threshold number of times, causing, by the server device, the respective overlay content to be delivered to the client device.

9. The non-transitory, computer-readable media of claim 8, wherein selecting the respective overlay content from the database of overlay content comprises selecting the respective overlay content based on the respective overlay content having a highest cost per mille (CPM) relative to other overlay content in the database of overlay content.

10. The non-transitory, computer-readable media of claim 8, wherein determining that the number of times that the respective overlay content has been displayed does not exceed the threshold number of times comprises determining that the number of times that the respective overlay content has been displayed within a predefined time period does not exceed the threshold number of times.

11. The non-transitory, computer-readable media of claim 8, wherein the overlay request includes overlay criteria, and wherein selecting the respective overlay content from the database of overlay content comprises using the overlay criteria as a basis for selecting the respective overlay content from the database of overlay content.

12. The non-transitory, computer-readable media of claim 11, wherein the overlay criteria comprises at least one of: (i) demographic criteria, (ii) geographic location criteria, (iii) language criteria, (iv) time of day criteria, (v) weather criteria, (vi) pollen count criteria, or (vii) viewing history criteria.

13. The non-transitory, computer-readable media of claim 8, wherein causing the respective overlay content to be delivered to the client device comprises:
   determining a source location of the respective overlay content; and
   communicating, to the client device, the determined source location for retrieval of the respective overlay content by the client device.

14. The non-transitory, computer-readable media of claim 13, wherein the source location is identified by a universal resource locator (URL), and wherein communicating the determined source location to the client device comprises communicating the URL to the client device.

15. A system comprising:
   one or more processors; and
   non-transitory, computer-readable media having stored thereon program instructions that, when executed by the one or more processors, cause the system to perform a set of operations comprising:
   receiving, from a content provider, media content;
   receiving, from a client device, an overlay request for overlay content to superimpose onto the media content;
   in response to receiving the overlay request, selecting respective overlay content from a database of overlay content;
   determining that an amount remaining in a monetary budget associated with the overlay request exceeds a threshold monetary budget, such that at least a necessary amount of monetary budget is available;
   determining that a number of times that the respective overlay content has been displayed does not exceed a threshold number of times; and
   in response to both (i) determining that the amount remaining in the monetary budget associated with the overlay request exceeds the threshold monetary budget and (ii) determining that the number of times that the respective overlay content has been displayed does not exceed the threshold number of times, causing the respective overlay content to be delivered to the client device.

16. The system of claim 15, wherein selecting the respective overlay content from the database of overlay content comprises selecting the respective overlay content based on the respective overlay content having a highest cost per mille (CPM) relative to other overlay content in the database of overlay content.

17. The system of claim 15, wherein determining that the number of times that the respective overlay content has been displayed does not exceed the threshold number of times comprises determining that the number of times that the respective overlay content has been displayed within a predefined time period does not exceed the threshold number of times.

18. The system of claim 15, wherein the overlay request includes overlay criteria, and wherein selecting the respective overlay content from the database of overlay content comprises using the overlay criteria as a basis for selecting the respective overlay content from the database of overlay content.

19. The system of claim 15, wherein causing the respective overlay content to be delivered to the client device comprises:

determining a source location of the respective overlay content; and communicating, to the client device, the determined source location for retrieval of the respective overlay content by the client device.

20. The system of claim 19, wherein the source location is identified by a universal resource locator (URL), and wherein communicating the determined source location to the client device comprises communicating the URL to the client device.

* * * * *